United States Patent
Greggs

(10) Patent No.: US 9,403,492 B1
(45) Date of Patent: Aug. 2, 2016

(54) VEHICLE BODY STRUCTURE

(71) Applicant: Nissan North America, Inc., Franklin, TN (US)

(72) Inventor: Alan Greggs, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/671,672

(22) Filed: Mar. 27, 2015

(51) Int. Cl.
   *B60J 7/00* (2006.01)
   *B60R 13/04* (2006.01)
   *B60R 11/00* (2006.01)

(52) U.S. Cl.
   CPC ............... *B60R 13/04* (2013.01); *B60R 11/00* (2013.01); *B60R 2011/004* (2013.01); *B60R 2011/0047* (2013.01)

(58) Field of Classification Search
   CPC ............... H01L 2924/00; H01L 2924/12036; H01L 2924/13033; H01L 2924/00014; H01L 2924/00015; H01L 2224/48091; H01L 2224/48247; B01D 29/23; B01D 29/90
   USPC ..................................................... 296/193.08
   See application file for complete search history.

(56) References Cited

U.S. PATENT DOCUMENTS

| | | | | |
|---|---|---|---|---|
| 4,886,312 A * | 12/1989 | Asoh | ...................... | B60J 1/1884 296/146.2 |
| 5,267,772 A * | 12/1993 | Ohta | .................... | B62D 21/152 296/187.11 |
| 5,611,592 A * | 3/1997 | Satou | ................... | B62D 25/087 296/203.04 |
| 6,886,885 B2 * | 5/2005 | White | .................. | B62D 25/087 296/187.11 |
| 7,073,230 B2 * | 7/2006 | Boville | ............... | B60R 13/0206 24/297 |
| 7,337,505 B1 | 3/2008 | Scroggie et al. | | |
| 7,429,076 B2 * | 9/2008 | Asahi | .................... | B62D 21/152 296/203.04 |
| 7,467,821 B2 * | 12/2008 | Wolkersdorfer | ....... | B62D 25/02 296/198 |
| 7,658,434 B2 * | 2/2010 | Sakane | ................... | B60R 1/002 296/146.15 |
| 7,794,007 B2 * | 9/2010 | Konet | .................... | B60J 1/1846 296/146.16 |
| 7,980,613 B2 * | 7/2011 | Murray | ............... | B60R 13/0206 296/1.08 |
| 7,997,618 B2 * | 8/2011 | Hartmann | .............. | B62D 25/08 180/311 |
| 8,011,718 B2 * | 9/2011 | Tsuyuzaki | ............. | B62D 25/08 296/193.08 |
| 8,191,961 B2 * | 6/2012 | Matsuoka | ............ | B62D 25/088 296/193.08 |
| 8,267,468 B2 * | 9/2012 | Amir | ..................... | B62D 25/087 296/193.08 |
| 8,291,553 B2 | 10/2012 | Moberg | | |
| 8,388,046 B2 * | 3/2013 | Hutter | .................... | B62D 25/04 296/187.13 |
| 8,517,460 B2 * | 8/2013 | Hoshino | .............. | B62D 25/087 296/193.08 |

(Continued)

*Primary Examiner* — Kiran B Patel
(74) *Attorney, Agent, or Firm* — Global IP Counselors, LLP

(57) ABSTRACT

A trim panel is attached to a vehicle surface by a plurality of first attachment clips and a second attachment clip. The plurality of first attachment clips are fixedly attached to the trim panel at spaced apart locations along a first section of the trim panel. Each of the first attachment clips prevents movement of the first section of the trim panel in a direction normal to the vehicle surface. The second attachment clip is fixedly attached to a second section of the trim panel such that the second attachment clip further attaches to the vehicle surface preventing movement of the second section in a direction normal to the vehicle surface and prevents deflection of the second section relative to the first section.

20 Claims, 26 Drawing Sheets

(56) References Cited

U.S. PATENT DOCUMENTS

| | | | |
|---|---|---|---|
| 8,528,295 B2 | 9/2013 | Glynn et al. | |
| 8,677,573 B2 | 3/2014 | Lee | |
| D703,597 S * | 4/2014 | Larson | D12/196 |
| 8,726,473 B2 | 5/2014 | Dole | |
| D709,014 S * | 7/2014 | Larson | D12/196 |
| 8,789,876 B2 * | 7/2014 | Sera | B62D 25/087 |
| | | | 296/193.08 |
| D710,284 S * | 8/2014 | Larson | D12/196 |
| 8,813,888 B2 * | 8/2014 | Ogawa | B62D 25/082 |
| | | | 180/180 |
| 8,844,992 B1 | 9/2014 | Noga et al. | |
| 8,865,290 B2 | 10/2014 | Gosis et al. | |
| 8,888,157 B2 * | 11/2014 | Narahara | B62D 25/2027 |
| | | | 296/1.08 |
| 8,899,667 B2 * | 12/2014 | Okamachi | B62D 25/08 |
| | | | 296/203.04 |
| 8,910,987 B1 * | 12/2014 | Greggs | B60R 13/04 |
| | | | 296/1.08 |
| 8,919,865 B2 * | 12/2014 | Ogawa | B62D 25/08 |
| | | | 296/187.11 |
| 8,967,702 B2 * | 3/2015 | Mochizuki | B62D 25/08 |
| | | | 296/146.9 |
| 8,979,156 B2 | 3/2015 | Mally | |
| 8,979,170 B2 * | 3/2015 | Kurita | B62D 25/02 |
| | | | 296/146.8 |
| 9,085,329 B2 * | 7/2015 | Komiya | B62D 21/11 |
| 9,090,292 B2 * | 7/2015 | Park | B62D 25/08 |
| 9,145,171 B2 * | 9/2015 | Kuenkler | B62D 25/02 |
| 9,193,391 B2 * | 11/2015 | Mildner | B62D 25/088 |
| 9,302,711 B2 * | 4/2016 | Ebihara | B62D 25/08 |
| 2006/0290173 A1 * | 12/2006 | Wolkersdorfer | B62D 27/023 |
| | | | 296/210 |
| 2011/0156437 A1 * | 6/2011 | Kishino | B60J 5/10 |
| | | | 296/146.8 |
| 2012/0153677 A1 * | 6/2012 | Matsuura | B62D 21/152 |
| | | | 296/193.08 |
| 2012/0223547 A1 * | 9/2012 | Horiguchi | B62D 25/087 |
| | | | 296/193.08 |
| 2013/0020822 A1 * | 1/2013 | Inoue | B62D 35/007 |
| | | | 296/1.08 |
| 2013/0241240 A1 * | 9/2013 | Tokumoto | B62D 25/08 |
| | | | 296/193.08 |
| 2013/0341970 A1 * | 12/2013 | Shimizu | B62D 25/087 |
| | | | 296/193.08 |
| 2014/0152054 A1 * | 6/2014 | Yano | B62D 25/087 |
| | | | 296/193.08 |
| 2014/0159428 A1 * | 6/2014 | Katou | B62D 25/087 |
| | | | 296/193.08 |
| 2014/0284962 A1 | 9/2014 | Mally | |

* cited by examiner

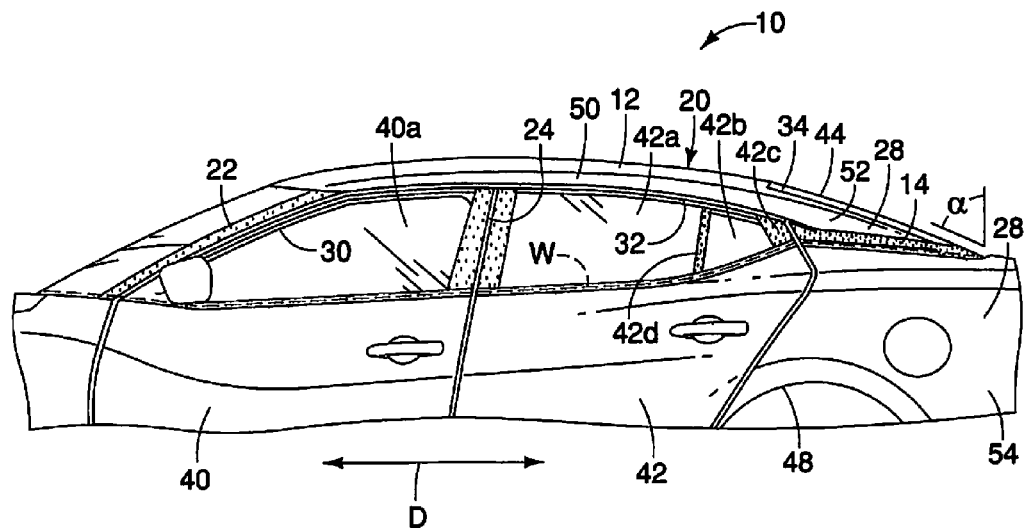

VEHICLE BODY STRUCTURE

BACKGROUND

1. Field of the Invention

The present invention generally relates to a vehicle body structure. More specifically, the present invention relates to a vehicle body structure having an outer surface with an exterior trim panel secured to the outer surface by a plurality of first clips and a second clip, the plurality of first clips configured to allow limited movement of the exterior trim panel in directions parallel to the outer surface and the second clip being configured to restrict movement of the exterior trim panel in at least one direction parallel to the outer surface.

2. Background Information

Exterior trim panels are often provided on exterior surfaces of a vehicle to enhance its overall appearance.

SUMMARY

One object of the present disclosure is to provide a vehicle body structure with a trim panel having an attachment structure that prevents deflection of a rearward end of the trim panel after installation.

In view of the state of the known technology, one aspect of the disclosure includes a vehicle body structure having a rear body panel and an exterior trim panel. The rear body panel has an outboard facing surface and a rearward facing surface. The outboard facing surface has a front peripheral edge. The rearward facing surface has an inboard peripheral edge. The outboard facing surface is a substantially upright surface and defines at least one alignment aperture. The rearward facing surface is an inclined surface relative to a vertical direction and a horizontal direction. The exterior trim panel has a finished surface and an attachment surface. The exterior trim panel further has a first section extending rearward from the front peripheral edge along the outboard facing surface and a second section that extends in a lateral inboard direction from a rearward end of the first section along the rearward facing surface to the inboard peripheral edge. The attachment surface includes at least one alignment pin that extends into the at least one alignment aperture. A plurality of first attachment clips are attached to the attachment surface at spaced apart locations along the first section. Each of the first attachment clips is attached to the rear body panel along the outboard facing surface in order to prevent movement of the first section of the exterior trim panel in directions normal to the outboard facing surface at corresponding ones of the spaced apart locations of the outboard facing surface. A second attachment clip is fixed to the attachment surface at a location along the second section such that the second attachment clip is attached to the rear body panel along the rearward facing surface adjacent to the inboard peripheral edge. The second attachment clip is configured to prevent deflection of the second section relative to the first section.

BRIEF DESCRIPTION OF THE DRAWINGS

Referring now to the attached drawings which form a part of this original disclosure:

FIG. 1 is a side view of a vehicle that includes a vehicle body structure with a rear pillar portion having an exterior trim panel that extends along the rear pillar portion from a rear side window to a rear window in accordance with a first embodiment;

FIG. 2 is a perspective view of the vehicle depicted in FIG. 1, showing the exterior trim panel in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 1, a vehicle 10 is illustrated in accordance with a first embodiment. The vehicle 10 includes a roof structure 12 with floating appearance (a floating roof design) that is in part due to exterior trim panels 14. The exterior trim panels 14 are a dark color, for example, black, giving the effect of having a floating roof, The exterior trim panels 14 are attached to the vehicle 10 via a plurality of first clips $C_1$ and at least one clip $C_2$ that are shown in FIGS. 18-29 and are described in greater detail below.

Figure 6:
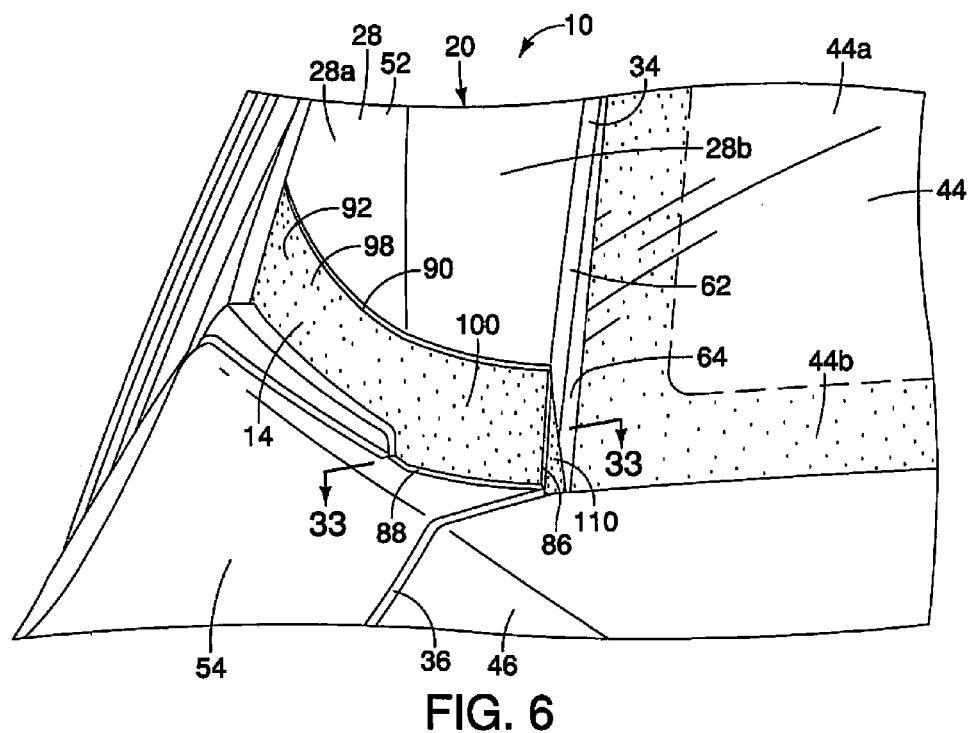
FIG. 6 is a rear view of a rear portion of the vehicle showing the exterior trim panel extending to the rear window in accordance with the first embodiment.
Figure 7:
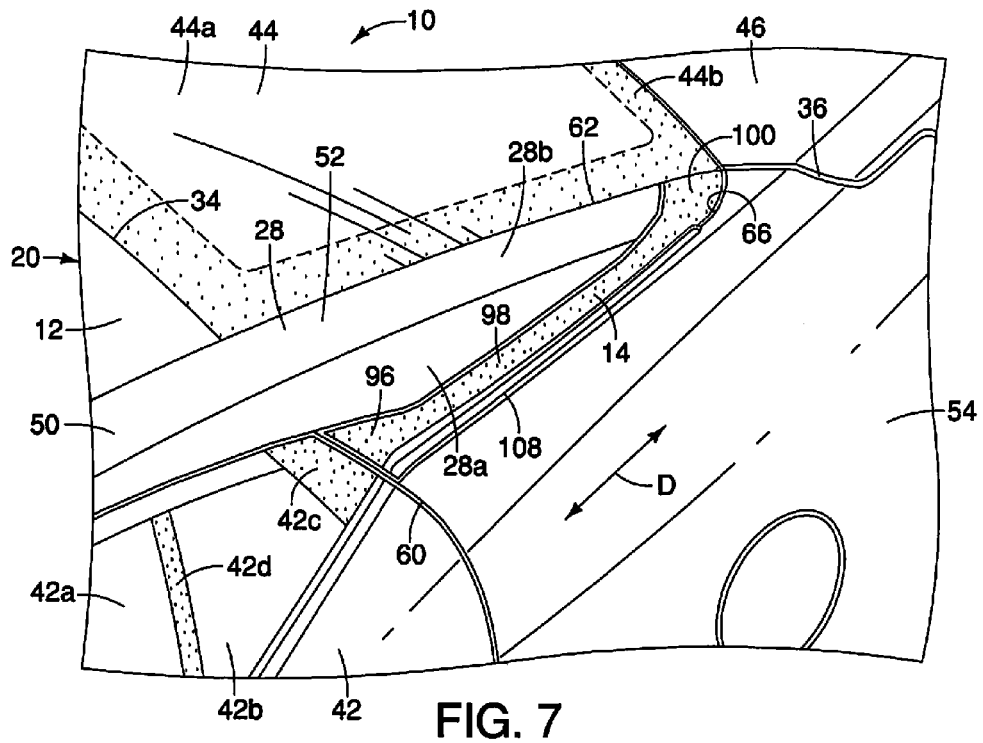
FIG. 7 is another perspective view of the side portion of the vehicle showing the exterior trim panel extending from the rear doorjamb to the rear window in accordance with the first embodiment.
Figure 8:
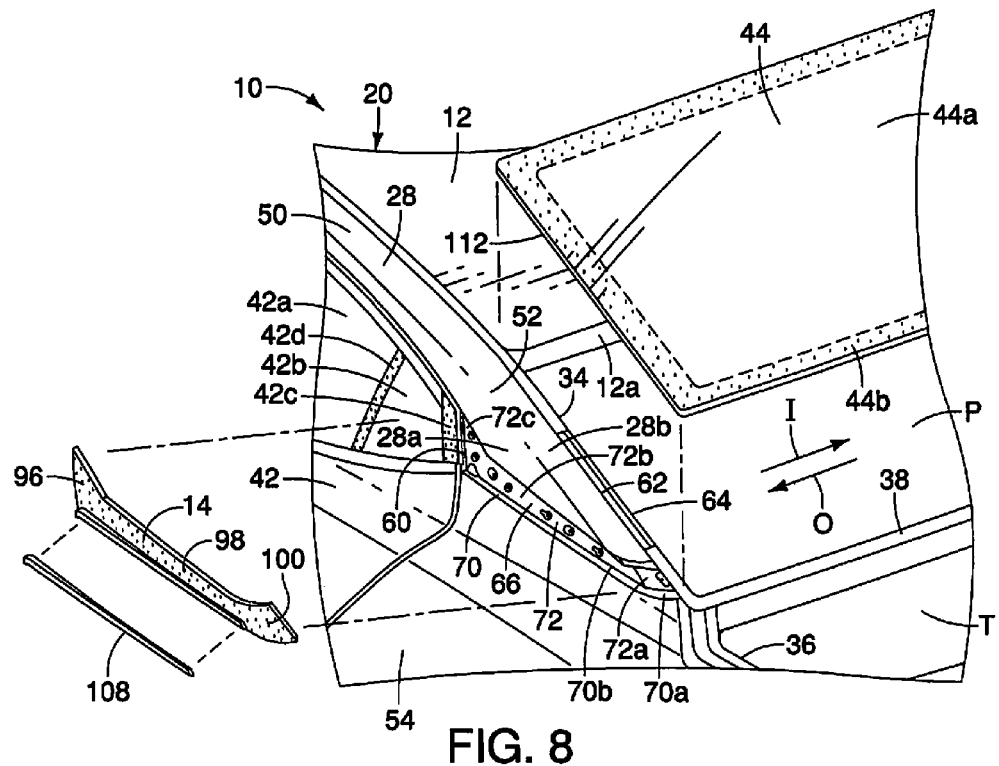
FIG. 8 is an exploded perspective view of the side portion of the vehicle showing the exterior trim panel removed revealing a recess formed in the rear pillar portion of the vehicle body structure in accordance with the first embodiment.

First, a brief description of various features of the vehicle 10 is provided below with specific reference to FIG. 1-12. The vehicle 10 has a vehicle body structure 20 that includes, among other things, an A-pillar 22, a B-pillar 24, a rear body panel 28 and the roof structure 12. A front door opening 30 is partially defined by the A-pillar 22, the B-pillar 24 and a portion of the roof structure 12, in a conventional manner. A rear door opening 32 (a side opening) is partially defined by the B-pillar 24, another portion of the roof structure 12 and the rear body panel 28. Further, a rear window opening 34 is partially defined by the rear body panel 28 and a rear portion of the roof structure 12. A trunk opening 36 is partially defined by the rear body panel 28 and by a lower window support member 38 (FIG. 8), at a lower area of the rear window opening 34. In FIG. 8, a trunk lid 46 has been removed to show the trunk opening 36 and the lower window support member 38. Beneath the window opening 34, within the passenger compartment of the vehicle 10, a rear parcel shelf P is visible. The rear parcel shelf P extends from the back of a rear seat (not shown) to the lower window support member 38. The rear parcel shelf P serves to separate the passenger compartment of the vehicle 10 from the trunk area T of the vehicle 10.

There are two rear body panels 28 and two exterior trim panels 14, one on each side of the vehicle 10 with the lower window support member 38 extending therebetween at a lower edge of the rear window opening 34 (see FIG. 8). The rear body panels 28 are identical to one another except that they are symmetrical mirror images of one another. Similarly, the exterior trim panels 14 are identical to one another except that they are symmetrical mirror images of one another. Therefore only one of the rear body panels 28 and one of the exterior trim panels 14 are described hereinbelow for the sake of brevity, since description of one equally applies to the other.

A front door 40 is installed to the A-pillar 22 for pivoting movement between a closed position (shown in FIGS. 1 and 2) and an open position (not shown) in a conventional manner. In the closed position, the front door 40 covers the front door opening 30. A rear door 42 is installed to the B-pillar 24 for pivoting movement between a closed position (shown in FIGS. 1 and 2) and an open position (not shown). In the closed position, the rear door 42 covers the rear door opening 32 in a conventional manner.

The front door 40 includes a window opening with a forward side window 40a moveably installed thereto in a conventional manner. The rear door 42 similarly includes a window opening with a first rearward side window 42a, a second rearward side window 42b, a divider 42d between the first rearward side window 42a and the second rearward side window 42b, and a non-transparent panel 42c at the rearward end of the rear window opening 34. A rear window glass 44 is fixedly installed to the vehicle body structure 20 covering the rear window opening 34. A trunk lid 46 is pivotally coupled to the vehicle body structure 20 in a convention manner for movement between a closed position (shown in FIGS. 2-6) and an open position (not shown).

The forward side window 40a, the first rearward side window 42a, the second rearward side window 42b, the non-transparent section 42c, and the rear window glass 44 have respective lower edges that together define respective portions of a vehicle body waistline W. The vehicle body waistline W is a conventional automotive expression that is defined as an imaginary line around a car or other vehicle at the level of the bottom of the windows. The vehicle body waistline W is depicted in several of the figures with a dashed line.

The A-pillars 22 are provided with a dark or black appearance on an exterior surface thereof. For example, a trim panel can be fitted on to each of the A-pillars 22 and can include a black paint or black finish. Alternatively, the A-pillar 22 can be assembled with an outer panel that is made of a black material.

Similarly, the front door 40 includes a rear trim panel that covers the B-pillar 24 in the closed position and the rear door 42 includes a front trim panel that also covers the B-pillar 24. The rear trim panel of the front door 40 and the front trim panel of the rear door 42 are dark in color or are black. These panels can be made of a black material or can be painted black to achieve the floating roof effect.

The rear body panel 28 is now described in greater detail with specific reference to FIGS. 2, 3 and 5-11. The rear body panel 28 is a contoured element of the vehicle body structure 20 that can be manufactured as a single element, or can be made of several different panels welded or otherwise rigidly fixed to one another. In the depicted embodiment, the rear body panel 28 is a single piece that includes a roof rail portion 50, a pillar portion 52 and a fender portion 54. The roof rail portion 50 extends along the side of the roof structure 12 above the front door opening 30 and above the rear door opening 32. The roof rail portion 50 can be part of the roof structure 12, or can be a panel that covers a roof rail (not shown) of the roof structure 12.

The pillar portion 52 extends downward and rearward from the roof rail portion 50 between the rear door opening 32 and the rear window opening 34. The fender portion 54 extends downward from the pillar portion 52 and defines a rear section of the vehicle 10, including a wheel well 48 (shown in FIGS. 1 and 2). The pillar portion 52 of the rear body panel 28 covers and/or forms part of a C-pillar structure (not shown) of the vehicle 10.

The vehicle body waistline W basically defines an approximate boundary between the pillar portion 52 and the fender portion 54, as is clear from the description hereinbelow. The rear body panel 28 has an outboard surface 28a (FIGS. 1-9), a rearward facing surface 28b and an inboard surface 28c (shown only in FIG. 10).

The pillar portion 52 includes the following: a forward peripheral end 58 that defines a doorjamb 60 of the rear door opening 32 (FIGS. 7, 9, 10 and 11); a rearward peripheral end 62 adjacent to the rearward facing surface 28b that includes a rear window supporting flange 64 (FIGS. 4, 8, 9 and 33); and a recess 66 that extends from the forward peripheral end 58 to the rearward peripheral end 62 of the pillar portion 52. The doorjamb 60 basically defines a front peripheral edge section of the rear body panel 28.

The pillar portion 52 has a contoured surface that includes compound curves. In the depicted vehicle body structure 20, there is no clear dividing line between the roof rail portion 50 and the pillar portion 52. Rather, the roof rail portion 50 and the pillar portion 52 have the appearance of being one single contoured element. However, it should be understood from the drawings and the description herein that the roof rail portion 50 and the pillar portion 52 can be altered such that there is a clear distinction between the two portions of the rear body panel 28.

Figure 5:
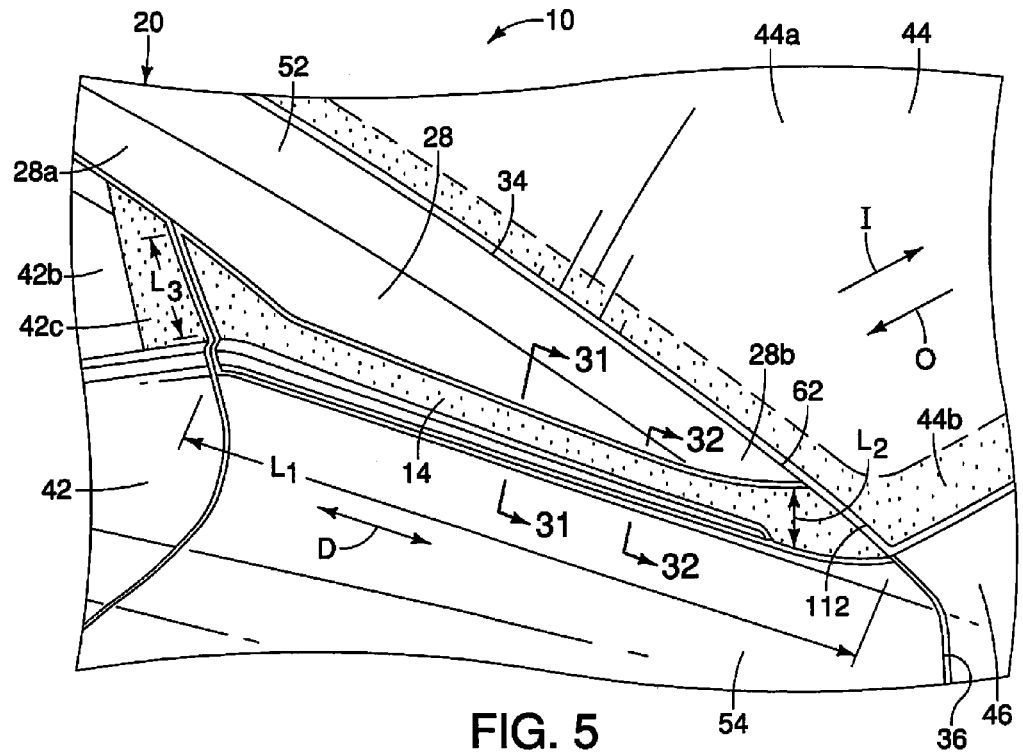
FIG. 5 is a perspective view of a side portion of the vehicle depicted in FIG. 1, showing the exterior trim panel extending from the rear doorjamb to the rear window in accordance with the first embodiment.

The pillar portion 52 curves downward and rearward from a point above the rear door opening 32 moving down toward the vehicle body waistline W. The outboard surface 28a of the rear body panel 28 is therefore not a flat surface in the depicted embodiment. Further, as shown in FIG. 5-7, the pillar portion 52 of the rear body panel 28 has a curve extending inboard toward the rear window opening 34 thereby defining the rearward facing surface 28b. As indicated in FIG. 8, the lower window support member 38 extends along the lower edge of the rear window opening 34 and is rigidly attached to the pillar portion 52. However, it should be understood that at least a portion of the lower window support member 38 can be integrally formed with the pillar portion 52 of the rear body panel 28.

Figure 9:
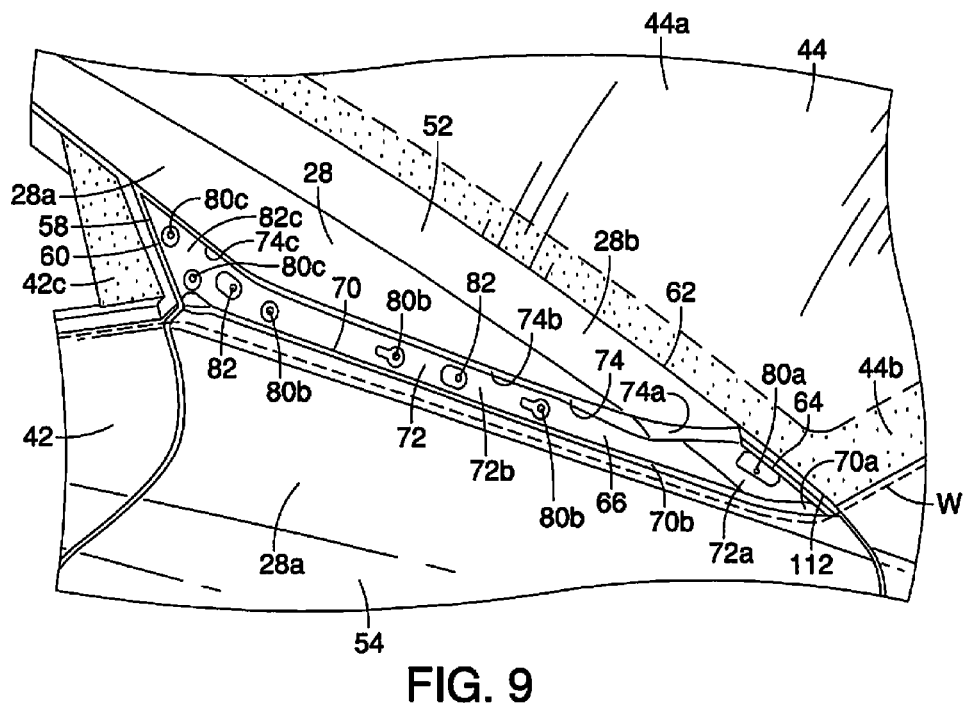
FIG. 9 is a perspective view of the rear pillar portion of the vehicle body structure showing the recess in accordance with the first embodiment.
Figure 11:
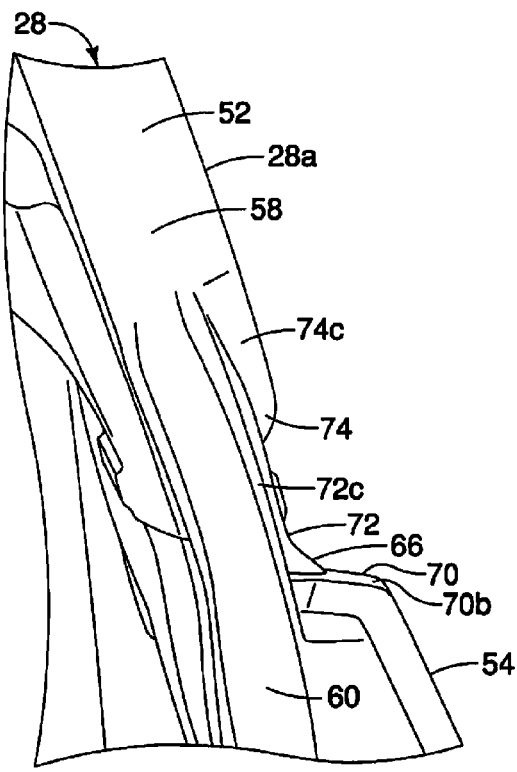
FIG. 11 is a front view of a portion of the rear doorjamb of the rear door opening showing the recess in the rear pillar portion in accordance with the first embodiment.

As shown in FIGS. 8, 9 and 11, the recess 66 of the pillar portion 52 is defined by a plurality of contoured surfaces. Specifically, the recess 66 includes a lower surface 70, a main surface 72 and an upper surface 74. The lower surface 70 also includes a rear section 70a that curves in an inboard direction and extends to a bottom corner of the rear window opening 34, as shown in FIGS. 8 and 9. A side section 70b of the lower surface 70 basically faces upward and extends in a vehicle longitudinal direction D along the vehicle body waistline W from the rear section 70a to the forward peripheral end 58.

The main surface 72 also includes a rear section 72a, a side section 72b and a forward section 72c. The rear section 72a curves in an inboard direction from the side section 72b and extends to the rear window opening 34, as shown in FIGS. 8 and 9. The rear section 72a is wider than the side section 72b, as measured between the lower surface 70 and the upper surface 74. The rear section 72a is also inclined with respect to vertical by an angle α (FIG. 1) that is between 50 and 75 degrees. In the depicted embodiment, the rear section 72a includes portions that are inclined by an angle of approximately 70 degrees with respect to vertical.

The side section 72b extends in the vehicle longitudinal direction D along a majority of a lower area of the pillar portion 52 from the rear section 72a to the forward section 72c. The forward section 72c is wider in a vertical direction than the side section 72b such that at the doorjamb 60, the lower surface 70 and the upper surface 74 are further apart from one another than at the side section 72b of the main surface 72 of the recess 66. More specifically, moving in a forward direction, the lower surface 70 and the upper surface 74 diverge, moving away from one another as they extend to the doorjamb 60. The forward section 72c of the main surface 72 extends from the side section 72b to the doorjamb 60.

The rear section 72a of the main surface 72 of the recess 66 includes an attachment aperture 80a. The side section 72b includes a plurality of attachment apertures 80b and an alignment aperture 82b. The forward section 72c of the recess 66 includes a pair of attachment apertures 80c and an alignment aperture 82c. The attachment aperture 80a, the attachment apertures 80b and the attachment apertures 80c constitute first attachment portions.

The upper surface 74 of the recess 66 includes a rear section 74a, a side section 74b and a forward section 74c. The rear section 74a curves in an inboard direction and extends from the side section 74b to the rear window opening 34 above the bottom corner of the rear window opening 34, but well below and spaced apart from an upper end of the rear window opening 34, as shown in FIGS. 8 and 9. The side section 74b of the upper surface 74 basically extends in the vehicle longitudinal direction D along the recess 66 from the rear section 74a to the forward section 74c. The forward section 74c extends slightly upward moving in the vehicle forward direction D from the side section 74b to the doorjamb 60.

As shown in FIGS. 3-8, the rear window glass 44 includes a transparent section 44a and a non-transparent section 44b. The transparent section 44a is centrally located and provides full visibility therethrough. The transparent section 44a makes up the majority of the rear window glass 44. The non-transparent section 44b include a dark, light blocking material, such as a paint or tape fixed to an interior side of the rear window glass 44 along the peripheral edge thereof. The non-transparent section 44b serves any of a variety of purposes. First, the non-transparent section 44b covers, hides and/or obscures the sealing/adhesive material that fixedly attaches the rear window glass 44 to the lower window support member 38, the rear window supporting flanges 64 of each of the two rear body panels 28 and a window supporting flange 12a that extends into the rear window opening 34 from the roof structure 12. Second, since the non-transparent section 44b can be defined by a black, non-transparent (and optionally non-translucent) material, the non-transparent section 44b serves as a design feature of the vehicle 10. The exterior trim panel 14 is dimensioned to align and blend in with a lower area of the non-transparent section 44b along the vehicle body waistline W to provide the floating roof effect.

The roof structure 12 includes a plurality of panels (not shown). It should be understood from the drawings and the description herein that the roof rail portion 50 of the rear body panel 28 can cover a roof rail assembly of the roof structure 12 or can be an integral part of the roof rail assembly of the roof structure 12. Since roof rails and roof structures are conventional in nature, further description is omitted for the sake of brevity.

Figure 17:
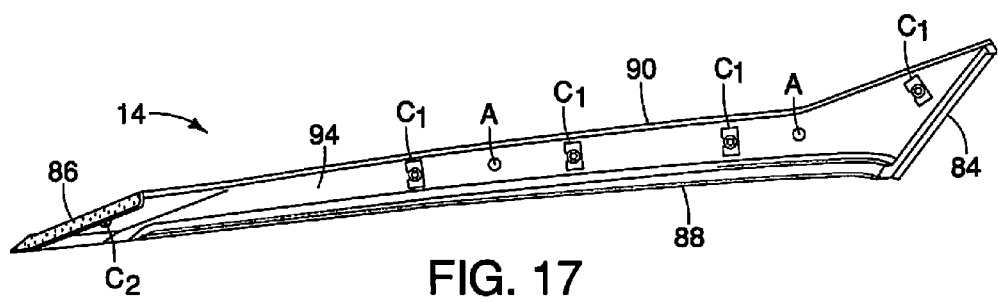
FIG. 17 is a side view of the exterior trim panel removed from the vehicle body structure showing a body facing surface thereof including the alignment pins, a plurality of first clips each having a fastener portion with a snap fitting projection and one second clip that has a fastener portion with a snap fitting projection in accordance with the first embodiment.

The exterior trim panel 14 is now described with specific reference to FIGS. 13-17 and 30-33. The exterior trim panel 14 includes a front end 84, a rear end 86, a lower edge 88, an upper edge 90 an outboard surface 92 and an inboard surface 94 (FIG. 17). The exterior trim panel 14 further includes a front section 96, a middle section 98 and a rear section 100. The exterior trim panel 14 also includes a chrome trim member 108, that is described in greater detail below In the depicted embodiment, the exterior trim panel 14 has a contoured shape with few straight lines. Specifically, the front section 96 is defined between diverging sections of the lower edge 88 and the upper edge 90. The front section 96 extends to the doorjamb 60 with the exterior trim panel 14 installed to the recess 66 of the rear body panel 28. The front section 96 and the middle section 98 extend in the vehicle longitudinal direction D when installed to the recess 66, with the middle section 98 extending rearward from the front section 96 to the rear section 100. However, the rear section 100 curves from the middle section 98 in a lateral inboard direction I such that the rear section 100 extends to the rear window opening 34 with the exterior trim panel 14 installed to the recess 66 of the rear body panel 28. The rear section 100 is also contoured such that the rear section 100 is inclined with respect to vertical by the angle α, as indicated in FIG. 1. More specifically, the exterior trim panel 14 has surfaces and contours that are specifically configured to fit into and overlay the surfaces of the recess 66. Further, the middle section 98 generally extends in the vehicle longitudinal direction D, while the rear section 100 extends in the lateral inboard direction I, such that the rear section 100 is angularly offset from the vehicle longitudinal direction D by an angle of between 65 degrees and 90 degrees.

As indicated in FIG. 8, when the exterior trim panel 14 is installed in the recess 66, the front section 96 covers the forward section 72c of the main surface 72 of the recess 66. The middle section 98 covers the side section 72b of the main surface 72 of the recess 66, and the rear section 100 covers the rear section 72a of the main surface 72 of the recess 66.

Figure 12:
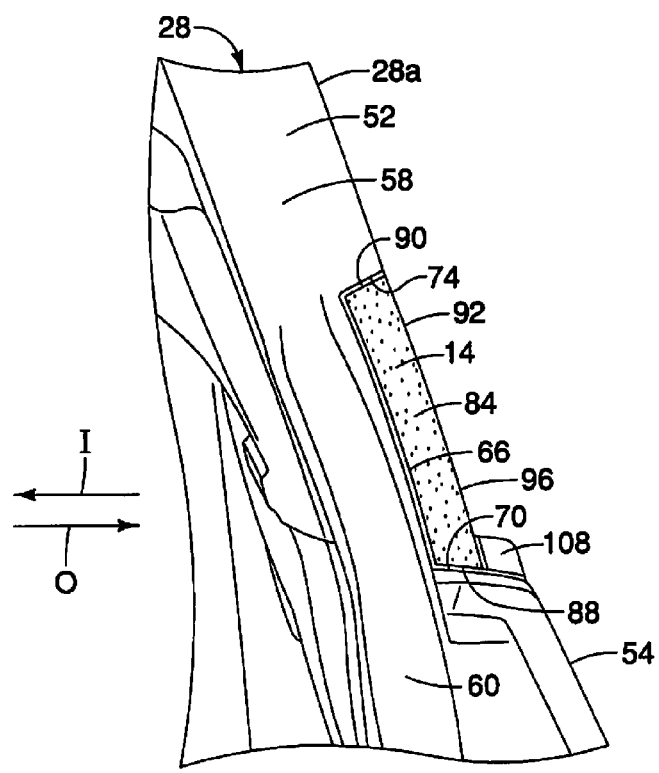
FIG. 12 is a front view of the portion of the doorjamb of the rear door opening similar to FIG. 11 showing the recess in the rear pillar portion with the exterior trim panel installed in accordance with the first embodiment.

As shown in FIG. 12, when installed in the recess 66, the lower edge 88 overlays the lower surface 70 of the recess 66 and the upper edge 90 overlays the upper surface 74.

Figure 13:
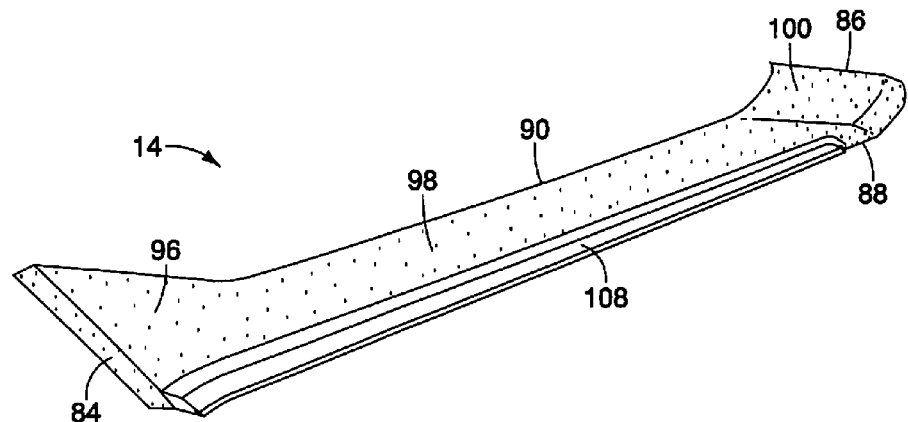
FIG. 13 is a perspective view of the exterior trim panel removed from the vehicle body structure showing an exterior surface and a front end thereof in accordance with the first embodiment.
Figure 14:
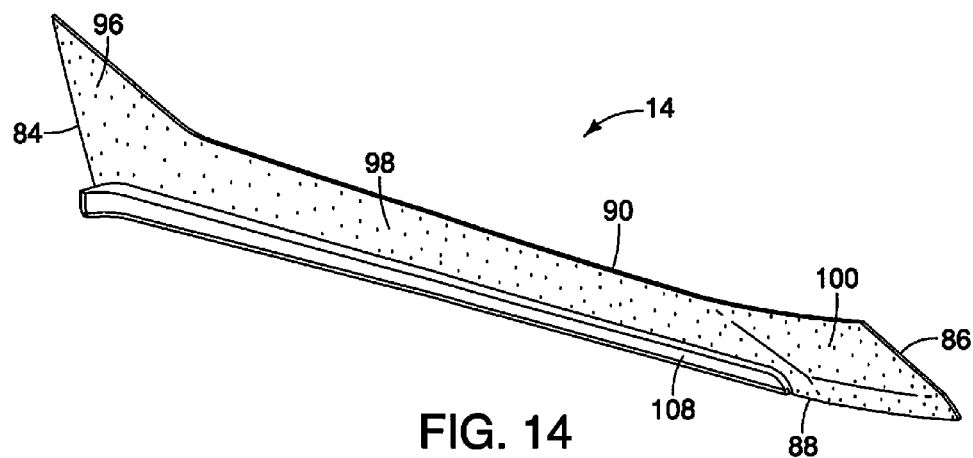
FIG. 14 is a perspective view of the exterior trim panel removed from the vehicle body structure showing the exterior surface and a rear end thereof in accordance with the first embodiment.
Figure 15:
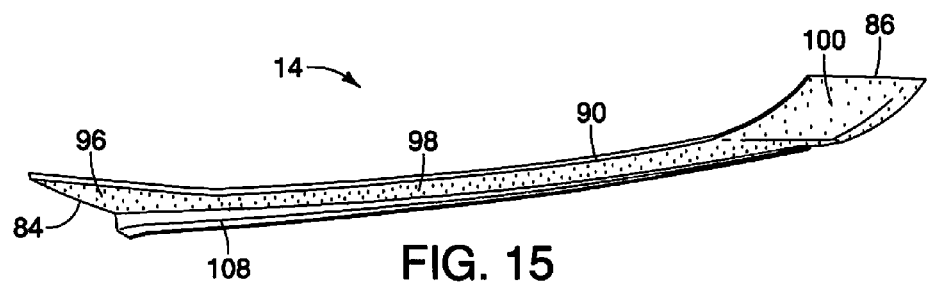
FIG. 15 is a top view of the exterior trim panel removed from the vehicle body structure in accordance with the first embodiment.
Figure 16:
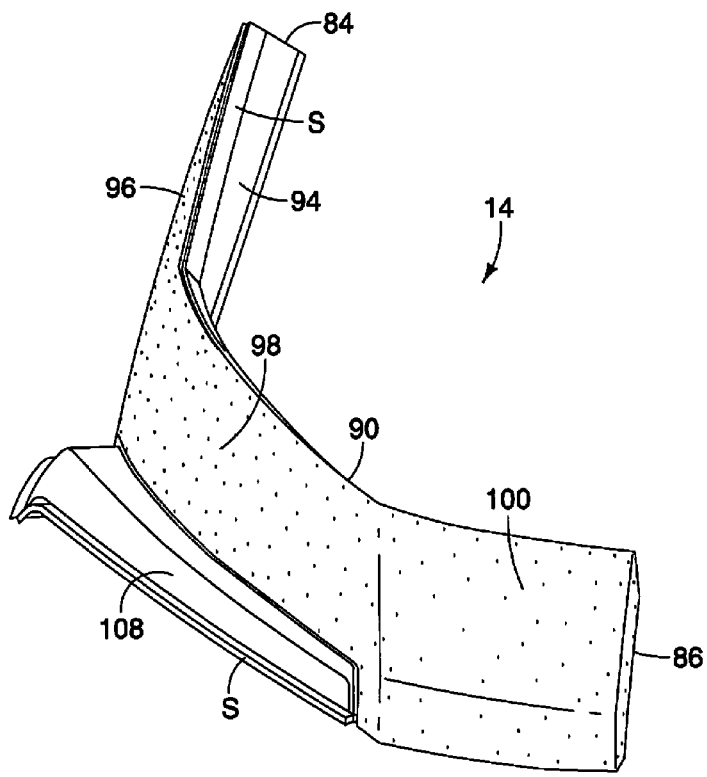
FIG. 16 is a rear view of the exterior trim panel removed from the vehicle body structure in accordance with the first embodiment.

As shown in FIG. 13, the front end 84 of the exterior trim panel 14 is generally flat and faces forward when installed to the recess 66. As shown in FIG. 12, when installed in the recess 66, the front end 84 is in approximate alignment with the doorjamb 60 (the front peripheral edge section of the rear body panel 28).

Figure 3:
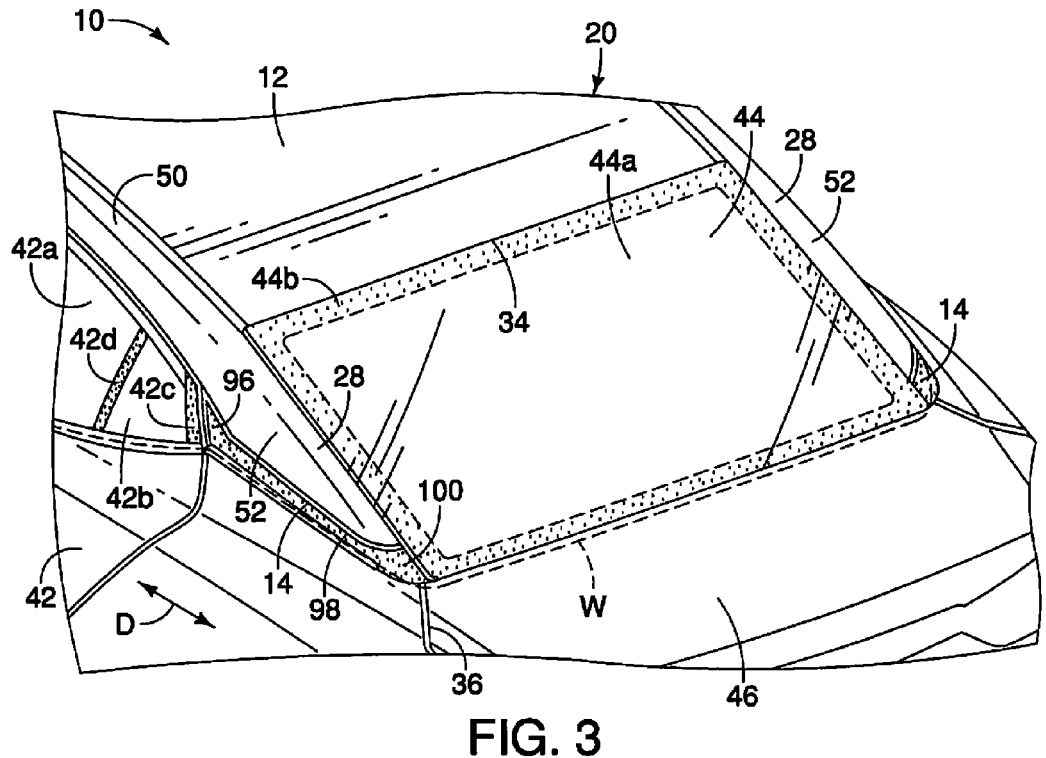
FIG. 3 is a perspective view of a rear portion of the vehicle depicted in FIG. 1, showing the exterior trim panel extending to the rear window in accordance with the first embodiment.
Figure 4:
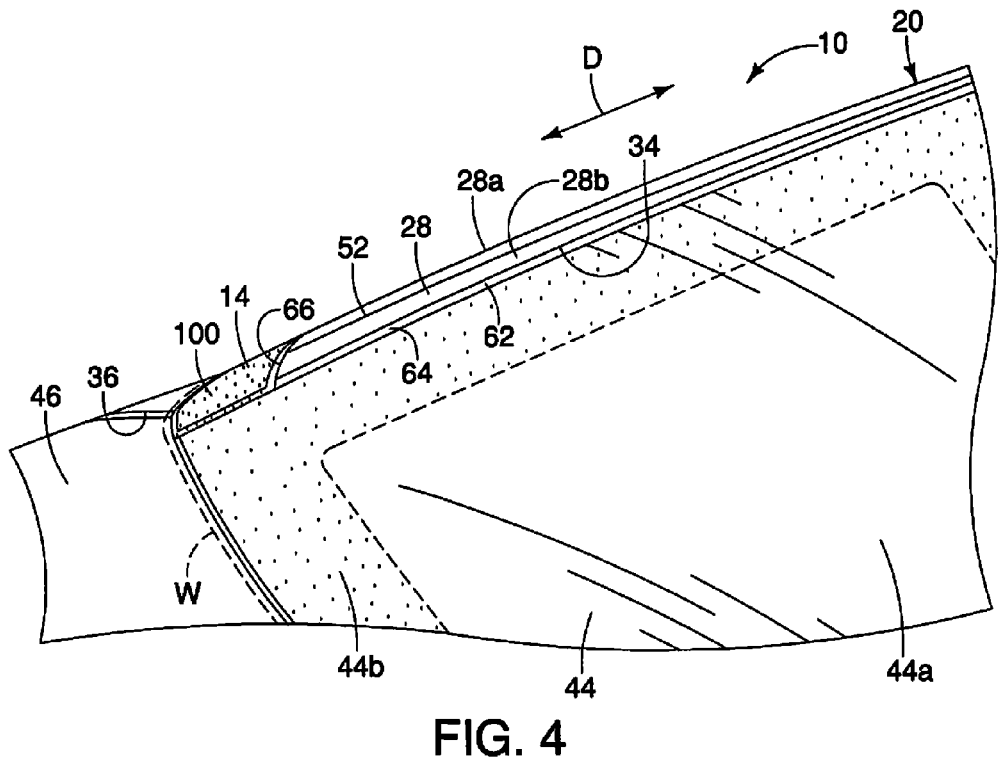
FIG. 4 is another perspective view of the rear portion of the vehicle, showing the exterior trim panel extending to the rear window in accordance with the first embodiment.
Figure 33:
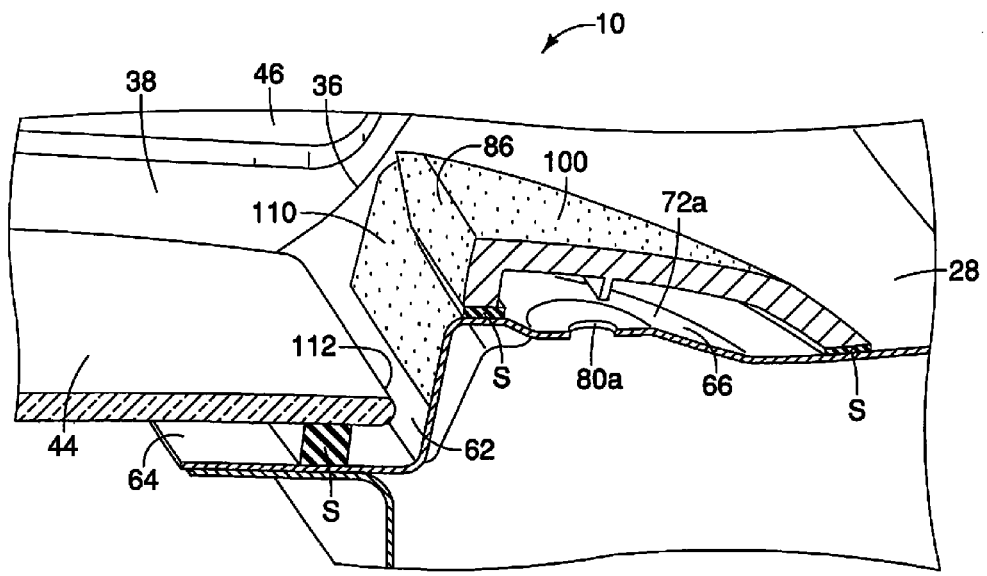
FIG. 33 is a cross-sectional view taken along the line 33-33 in FIG. 6 in accordance with the first embodiment.

As shown in FIGS. 4 and 33, the rear end 86 of the exterior trim panel 14 has a flat contour and aligns with the rearward peripheral end 62 of the pillar portion 52 of the rear body panel 28.

When installed to the recess 66, the lower edge 88 of the exterior trim panel 14 coincides with the vehicle body waistline W. In other words, a rear end of the lower edge 88 of the exterior trim panel 14 is in alignment with a lower edge of the rear window glass 44 and a front end of the lower edge 88 is in alignment with a lower edge of the non-transparent section 42b of the rearward side window 42a of the rear door 42.

As shown in FIG. 17, the inboard surface 94 of the exterior trim panel 14 is provided with the plurality of first clips $C_1$, at least one second clip $C_2$ and a pair of alignment pins A. The first clips $C_1$ are located on the inboard surface 94 along the front section 96 and the middle section 98 of the exterior trim panel 14. The second clip $C_2$ is located on the inboard surface 94 at the rear section 100. More specifically, the first clips $C_1$ are employed to attach the front section 96 and the middle section 98 to the vehicle body structure 20 and the second clip $C_2$ is employed to attach the rear section 100 of the exterior trim panel 14 to the vehicle body structure 20.

A description of the first clips $C_1$ and the second clip $C_2$ is provided now with specific reference to FIGS. 19-29. The second clip $C_2$ has a different structure and provides differing benefits and attachment configurations as compared to the first clips $C_1$, as is explained below.

One of the first clips $C_1$ is shown on the inboard surface 94 in FIGS. 18-23. Since all of the first clips $C_1$ are functionally identical and structurally the same, description of one of the first clips $C_1$ applies equally to all of the plurality of first clips $C_1$. The second clip $C_2$ is shown in FIGS. 24-29, and is described further below, after a description of the first clip $C_1$.

The first clip $C_1$ includes a first doghouse 75 and a fastening member 76. The fastening member 76 is shown removed from the first doghouse 75 in FIGS. 20 and 21, and is described further below. The first doghouse 75 is also referred to herein below as a first base portion.

Figure 18:
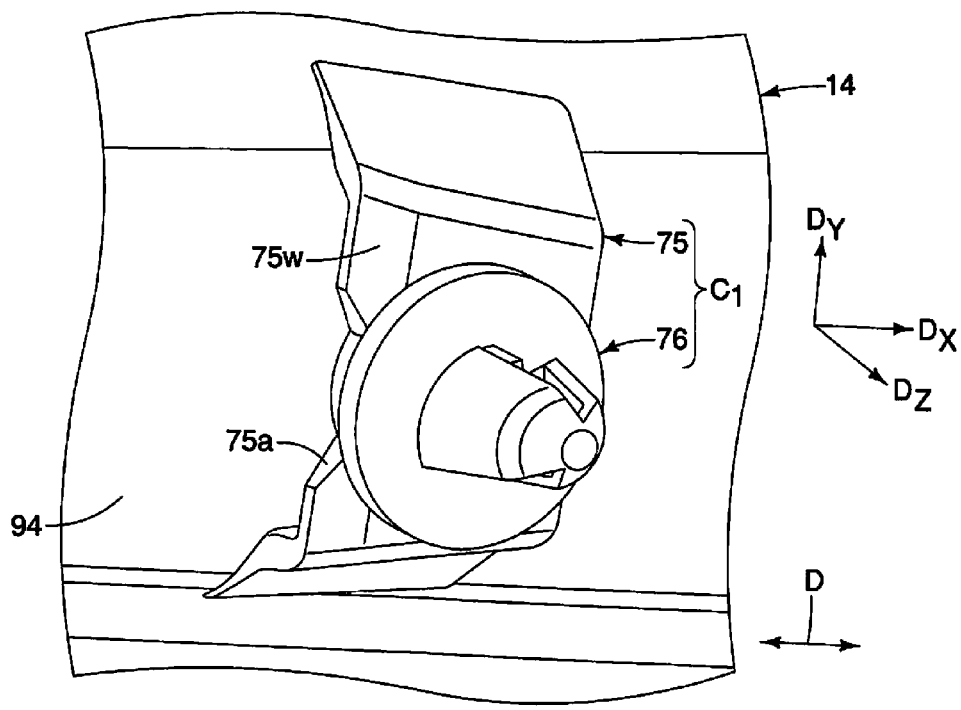
FIG. 18 is a perspective view of one of the plurality of first clips including a first doghouse formed with the exterior trim panel with the fastener portion installed to the first doghouse in accordance with the first embodiment.
Figure 19:
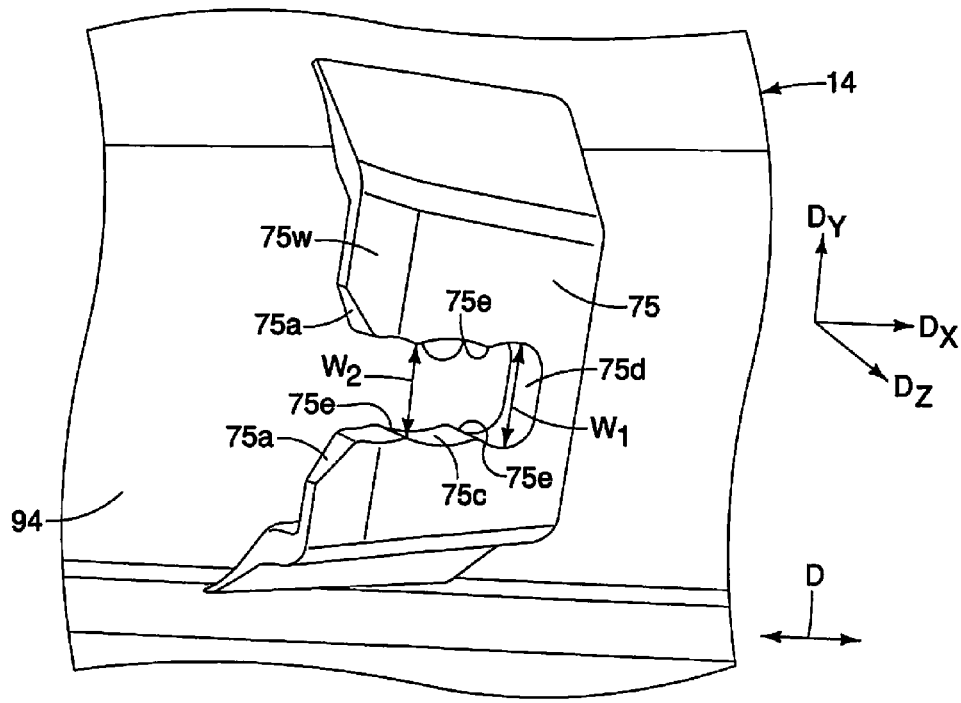
FIG. 19 is another perspective view of the one of the plurality of first clips showing the first doghouse with the fastener portion removed in accordance with the first embodiment.
Figure 22:
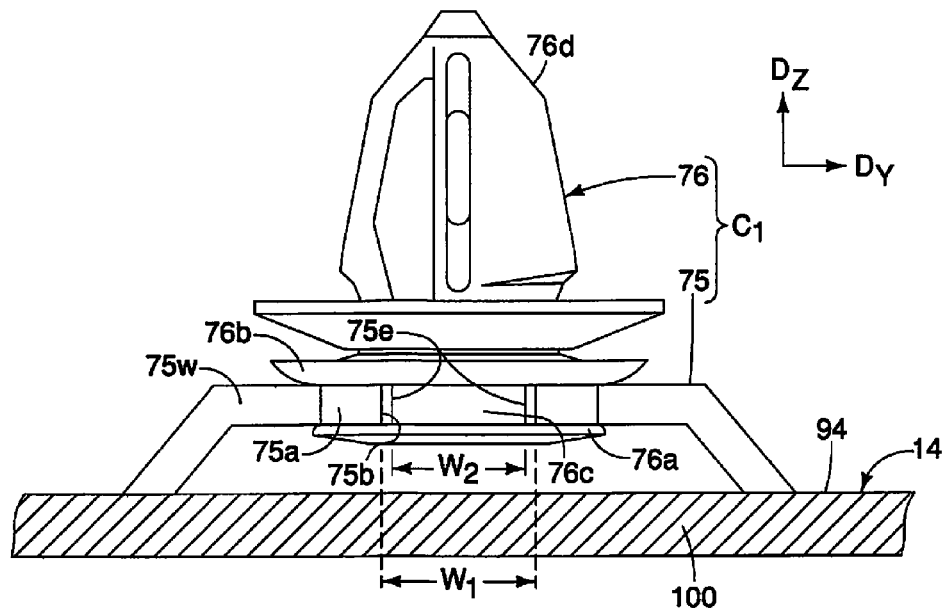
FIG. 22 is a cross-sectional view of the exterior trim panel showing the first doghouse of the first clip with the fastener portion installed to the first doghouse in accordance with the first embodiment.

As shown in FIGS. 18, 19 and 22, the first doghouse 75 is a structure formed integrally with the exterior trim panel 14 on the inboard surface 94. The first doghouse 75 is basically a flange or web 75w that includes a section spaced apart from the inboard surface 94. Since doghouse structures in general are conventional structures, further description is omitted for the sake of brevity.

Figure 23:
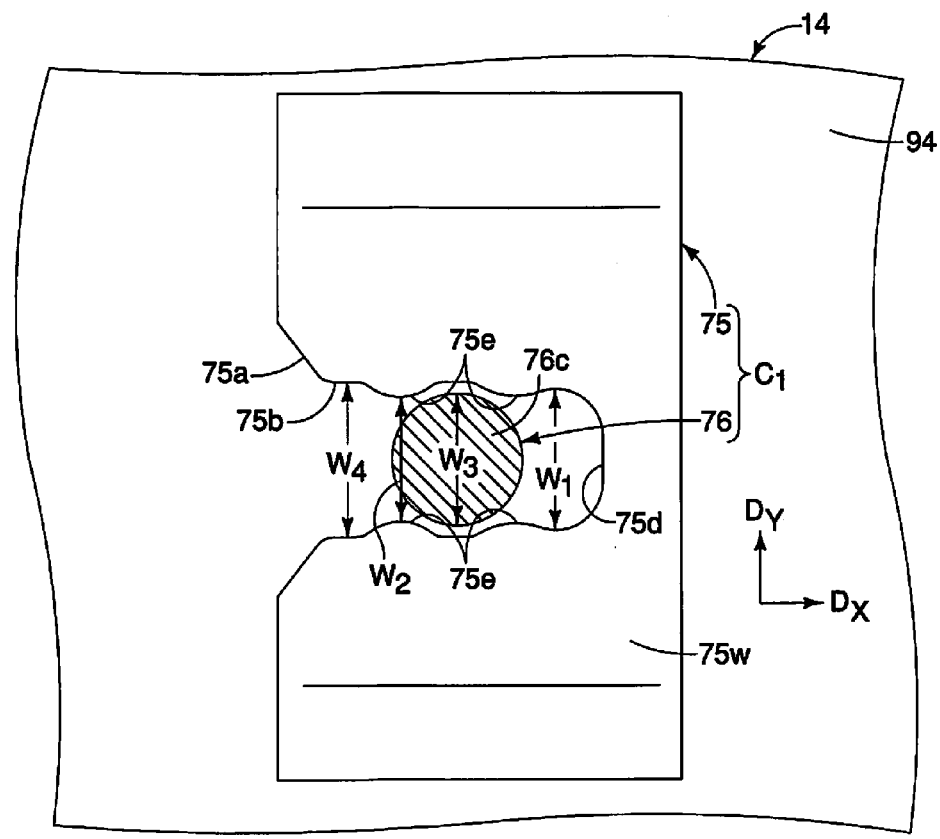
FIG. 23 is a side view of the first clip depicted in FIG. 22 showing a shaft of the fastener portion in cross-section installed within a slot of the first doghouse in accordance with the first embodiment.
Figure 24:
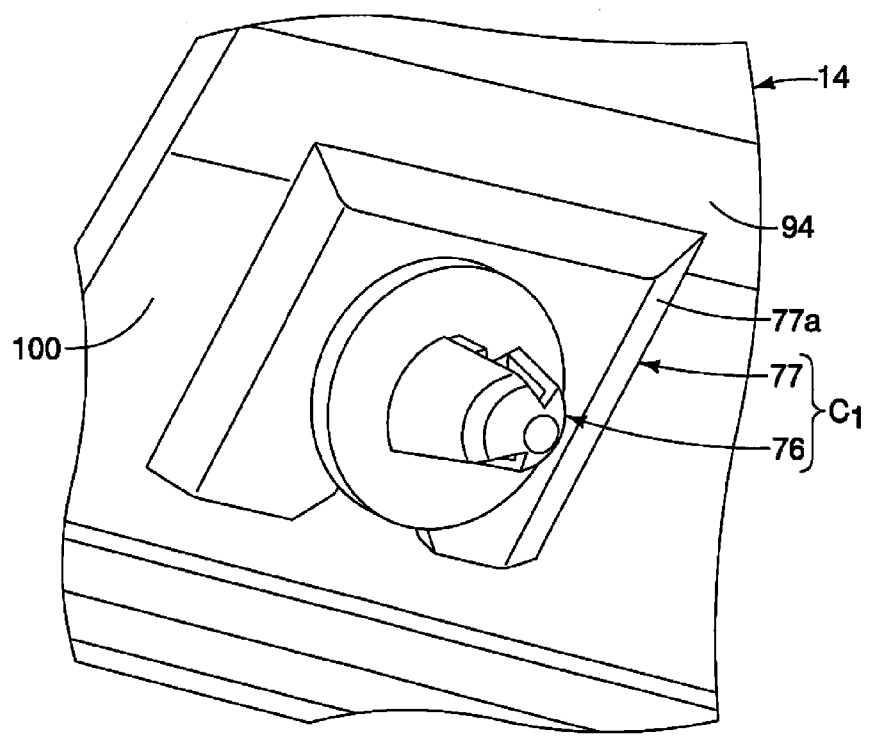
FIG. 24 is a perspective view of the second clip including a second doghouse formed with the exterior trim panel with the fastener portion installed to the second doghouse in accordance with the first embodiment.

As shown in FIGS. 19, 22 and 23, the web 75w of the first doghouse 75 includes first slot 75a. The first slot 75a has an open end 75b, a mid-section 75c, a closed end 75d and a plurality of inwardly protruding projections 75e. The closed end 75d of the slot 75a has a maximum width, herein after referred to as a first width $W_1$, as shown in FIGS. 19 and 23. Opposing pairs of the plurality of inwardly protruding projections 75e define a minimum width hereinafter referred to as a second width $W_2$. The open end 75b defines a width $W_4$, and the mid-section 75c defines a width $W_5$. In the depicted embodiment, the width $W_5$ is greater than the width $W_4$. However, the width $W_5$ can alternatively be equal to the width $W_4$.

Figure 20:
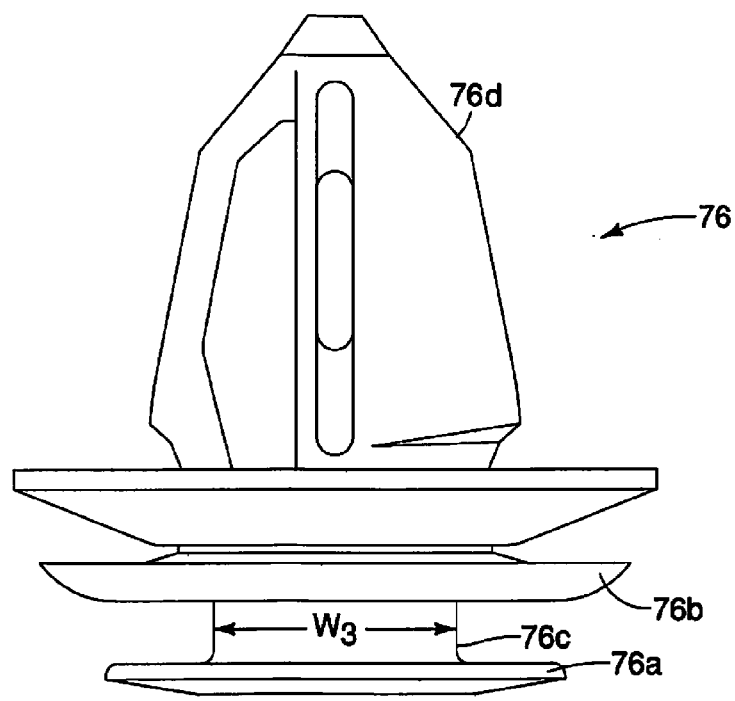
FIG. 20 is a side view of one of the fastener portions including the snap fitting projections, shown removed from the first doghouse in accordance with the first embodiment.
Figure 21:
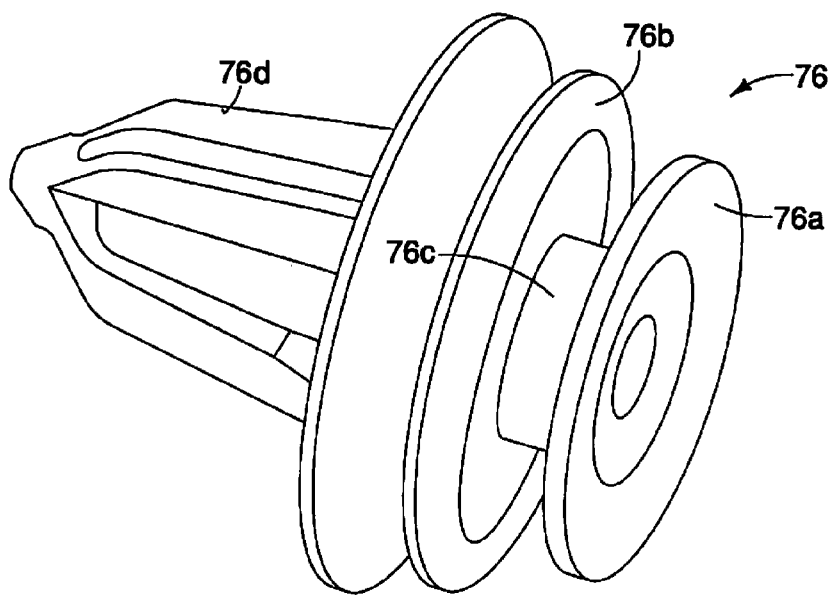
FIG. 21 is a perspective view of the fastener portion depicted in FIG. 20 in accordance with the first embodiment.

As shown in FIGS. 20 and 21, the fastening member 76 includes a first plate 76a, a second plate 76b, a shaft portion 76c and a snap fitting projection 76d all integrally formed as a single, monolithic element. The fastening member 76 is made of a plastic or polymer material that has at least a small degree of flexibility but is basically a rigid fastener with only sufficient resiliency to allow installation the slot 75a and the apertures in the rear body panel 28.

The first plate 76a and second plate 76b are spaced apart from one another by a distance that is approximately equal to the thickness of web 75w of the first doghouse 75. The first plate 76a and second plate 76b are fixedly attached to one another by the shaft portion 76c. The shaft portion 76c has an outer diameter $W_3$ that is smaller than widths $W_1$, $W_4$ and $W_5$ of the slot 75a but greater (larger) than the width $W_2$ defined between the inwardly protruding projections 75e of the slot 75a. In order to install the fastener member 76 into one of the slots 75a, a small amount of force must be applied to the fastener member 76 in order to forcibly push the shaft portion 76c past the first pair of the inwardly protruding projections 75e of the slot 75a such that the shaft portion 76c is positioned in mid-section 75c of the slot 75a, as shown in FIG. 23. Since the width $W_2$ is less than the diameter $W_3$ of the shaft portion 76c (the width $W_3$ is greater than the width $W_2$), the shaft portion 76c is retained within the mid-section 75c of the slot 75a. Since the diameter $W_3$ of the shaft portion 76c is less than the width $W_1$ of the slot 75a at the mid-section 75c, the fastener member 76 can undergo limited movement within the mid-section 75c.

Consequently, with the fastener member 76 installed to the slot 75a of the first doghouse 75, the shaft portion 76c can undergo limited movement in the directions $D_X$ and $D_Y$ relative to the exterior trim panel 14. Hence, those portions of the exterior trim panel 14 that are attached to the vehicle body structure 20 by the clips $C_1$ are able to undergo limited movement the directions $D_X$ and $D_Y$ but are prevented from moving in the direction $D_Z$.

The second clip $C_2$ is shown on the inboard surface 94 of the exterior trim panel 14 at the rear section 100 thereof in FIGS. 24-29. The second clip $C_2$ includes a second doghouse 77 and one of the fastener members 76. The second doghouse 77 is also referred to herein below as a second base portion. The fastener member 76 is as described above and shown in FIGS. 20 and 21. The second doghouse 77 is a structure formed integrally with the exterior trim panel 14 on the inboard surface 94 at the rear section 100. The second doghouse 77 is basically a flange or web 77w that includes a section spaced apart from the inboard surface 94. The second doghouse 77 includes a slot 77a that is described in greater detail below. Since doghouse structures (except for the slot 77a) are conventional structures, further description is omitted for the sake of brevity.

Figure 25:
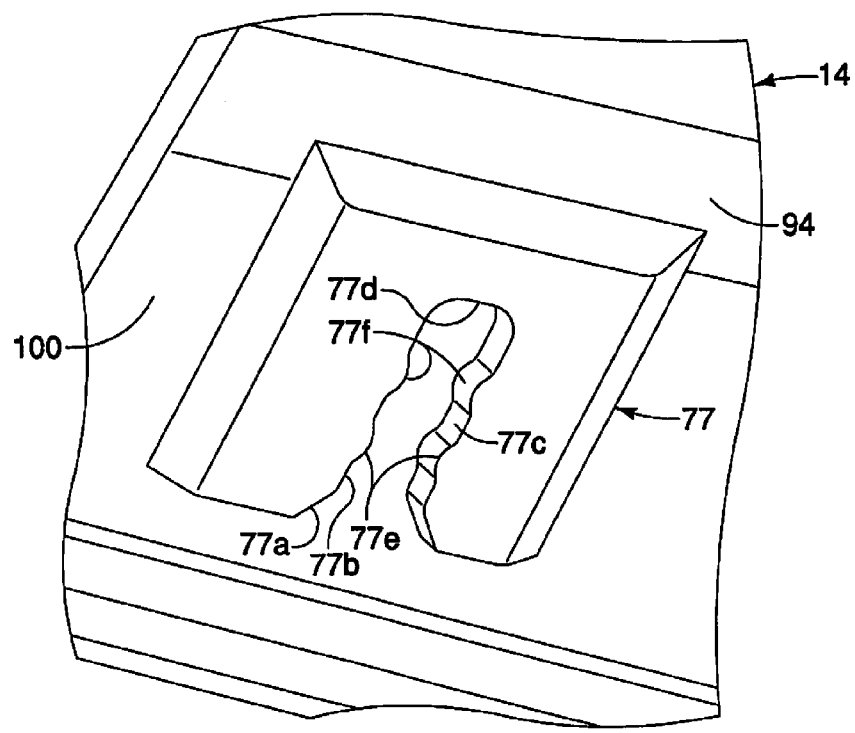
FIG. 25 is a perspective view of the second clip showing the second doghouse with the fastener portion removed in accordance with the first embodiment.
Figure 26:
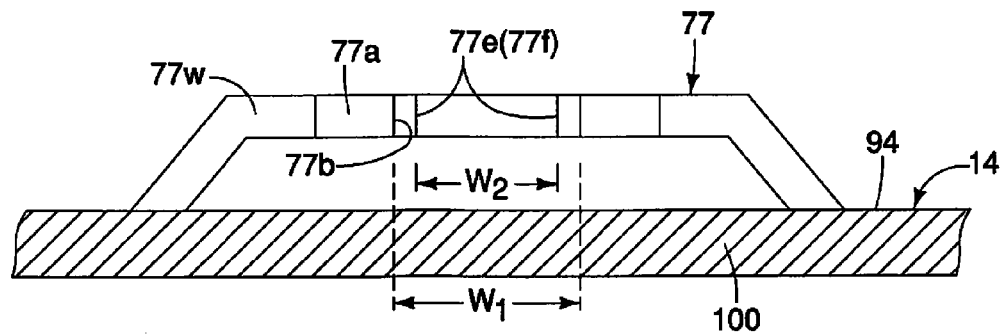
FIG. 26 is another cross-sectional view of the exterior trim panel showing the second doghouse of the second clip with the fastener portion removed from the second doghouse in accordance with the first embodiment.
Figure 27:
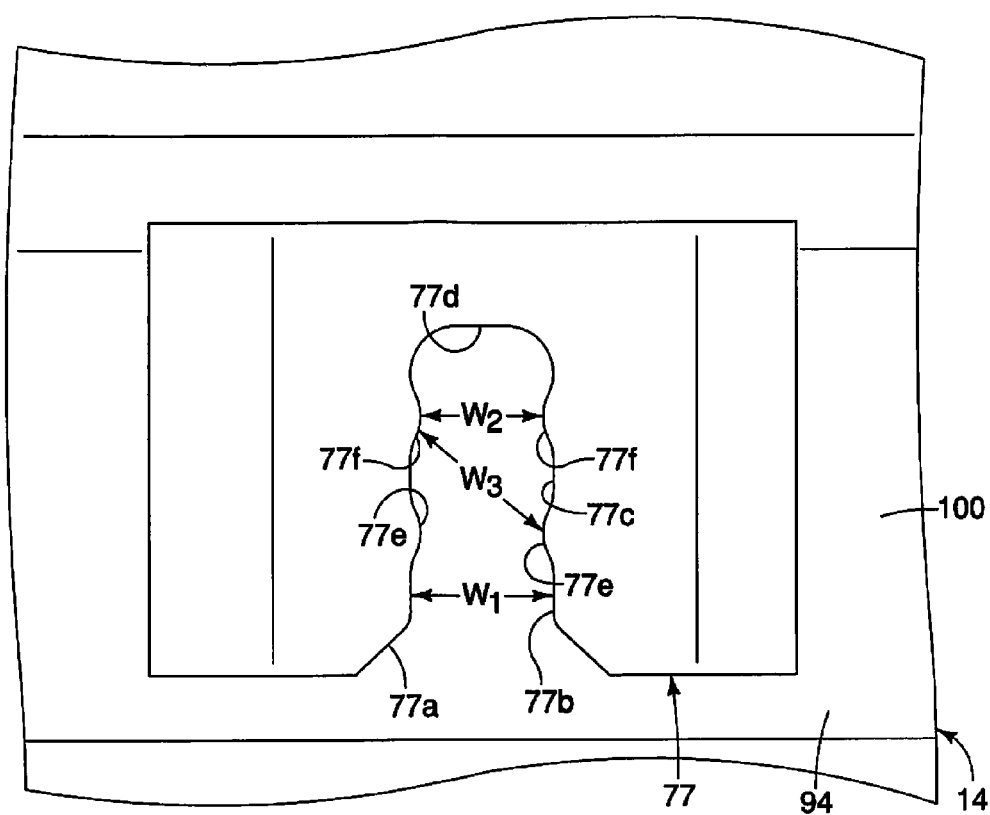
FIG. 27 is a side view of the second clip depicted in FIG. 26 showing a slot of the second doghouse in accordance with the first embodiment.
Figure 28:
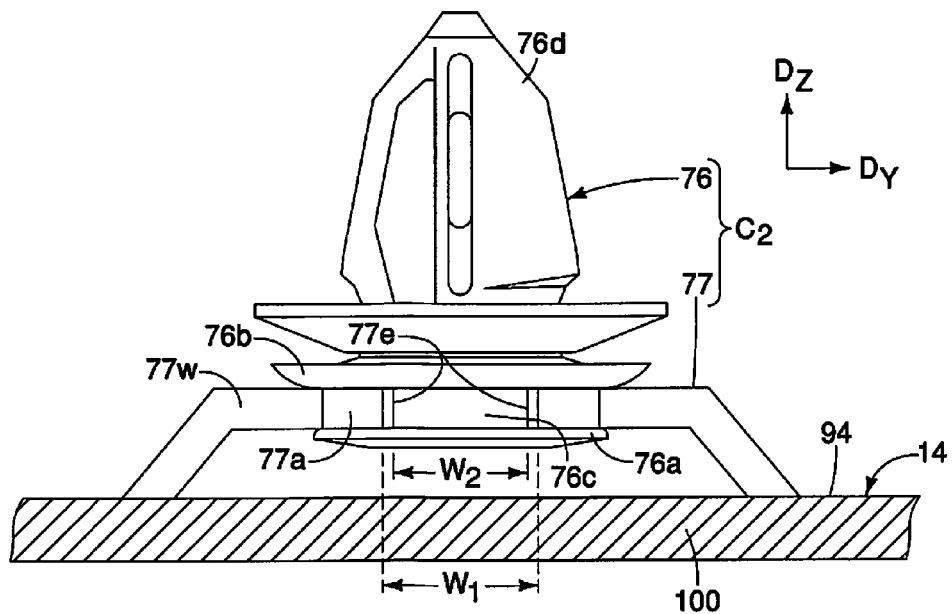
FIG. 28 is another cross-sectional view of the exterior trim panel showing the second doghouse of the second clip with the fastener portion installed in the slot of the second doghouse in accordance with the first embodiment.

As shown in FIGS. 25-27, the web 77w of the second doghouse 77 includes the second slot 77a. The second slot 77a has an open end 77b, a mid-section 77c, a closed end 77d and a two pairs of inwardly protruding projections 77e. The open end 77b of the slot 77a has a maximum width that is equal to the first width $W_1$, as shown in FIG. 27. The inwardly protruding projections 77e define a minimum width therebetween that is equal to the second width $W_2$. The closed end 77d also has a width that is also equal to the first width $W_1$.

The mid-section 77c can have a maximum width that is equal to the width $W_1$. The width $W_3$ of the shaft portion 76c of the fastener member 76 is approximately equal to the width $W_1$ of the mid-section 77d.

Figure 29:
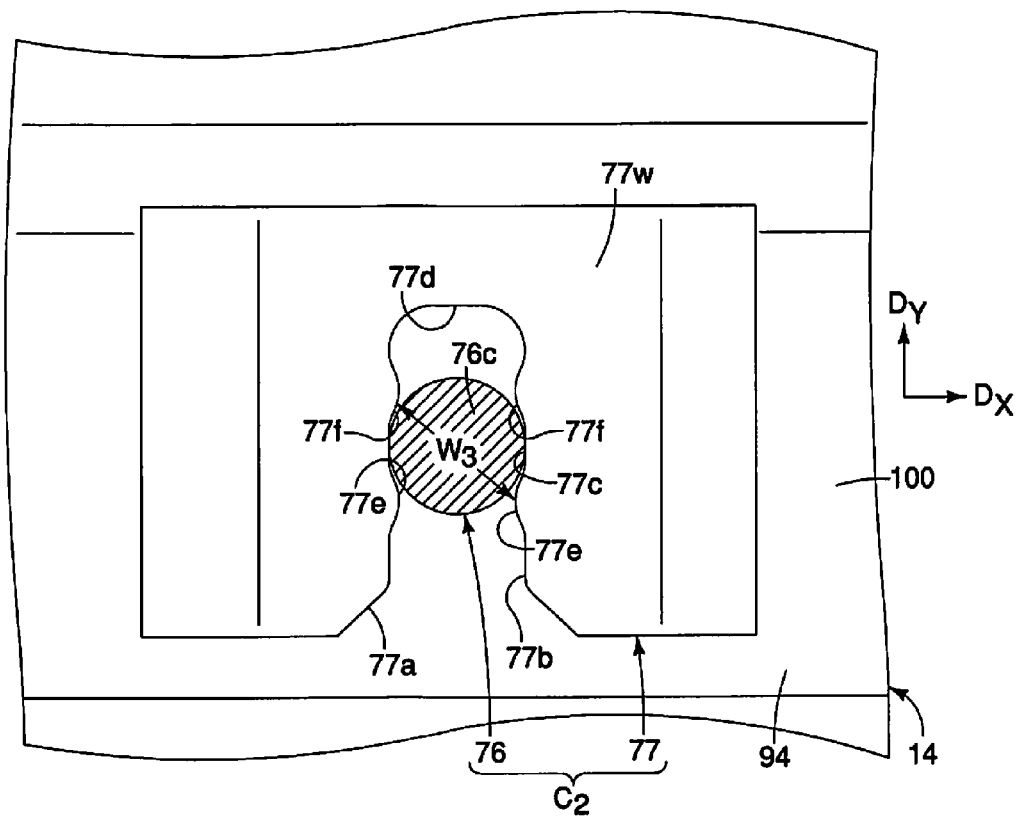
FIG. 29 is another side view of the second clip depicted in FIG. 26 showing a shaft of the fastener portion in cross-section installed within the slot of the second doghouse in accordance with the first embodiment.

Consequently, when the fastener member 76 is inserted into the slot 77a and the shaft portion 76c of the fastener member 76 is pushed past the first pair of projections 77e and into the mid-section 77c of the slot 77, the shaft portion 76c is non-movably confined within the mid-section 77c of the slot 77 in the direction $D_X$, as shown in FIG. 29. In other words, the shaft portion 76c of the fastener member 76 is trapped within the mid-section 77c. Adjacent ones of the inwardly protruding projections 77e are spaced apart from one another by a distance that allows the shaft portion 76c of the fastener member 76 to undergo a limited amount of movement in the direction $D_Y$. Hence, the fastener member 76 is prevented from moving in the $D_X$ and $D_Z$ directions relative to the doghouse structure 77 and the rear section 100 of the exterior trim panel 14.

The fastening member 76 is prevented from moving in the direction $D_Z$ (FIGS. 24 and 26) due to the spacing between the first plate 76a and the second plate 76b and the thickness of the web 77w. Hence, that portion of the exterior trim panel 14 that is attached to the vehicle body structure 20 by the second clip $C_2$ is prevented from moving in the directions $D_X$ and $D_Z$ due to the structure of the second clip $C_2$. Further, with the second clip $C_2$ attaching the rear section 100 of the exterior trim panel 14 to the rear body panel 28, the rear section 100 is prevented from deflecting relative to the front section 96 and the middle section 98 of the exterior trim panel 14.

The first clip $C_1$ are fixedly attached to the inboard surface 94 via the slot 75a in the first doghouse 75. The slots 75a extend in a lateral direction of the first doghouse 75, where the lateral direction of the first doghouse 75 corresponds to the direction $D_X$ and is approximately the same as the vehicle longitudinal direction D.

Figure 10:
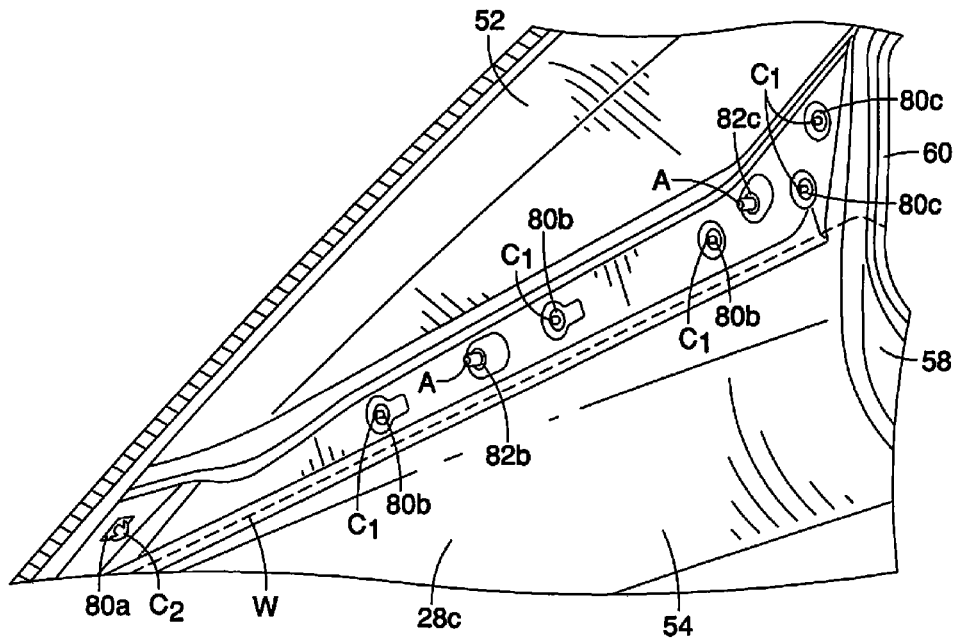
FIG. 10 is a perspective view of an inner surface of a panel that comprises the rear pillar portion of the vehicle body structure showing snap-fitting projections and alignment pins of the exterior trim panel extending through apertures in the rear pillar portion in accordance with the first embodiment.

The alignment pins A are rigidly fixed to or integrally formed with the inboard surface 94 in order to ensure proper positioning of the exterior trim panel 14 relative to the rear body panel 28. FIG. 10 is a view of the inboard surface 28c of the rear body panel 28 showing the first clips $C_1$ extending through the attachment apertures 80b and 80c, the second clip $C_2$ extending through the attachment aperture 80a and the alignment pins A extending through the alignment apertures 82b and 82c.

Figure 30:
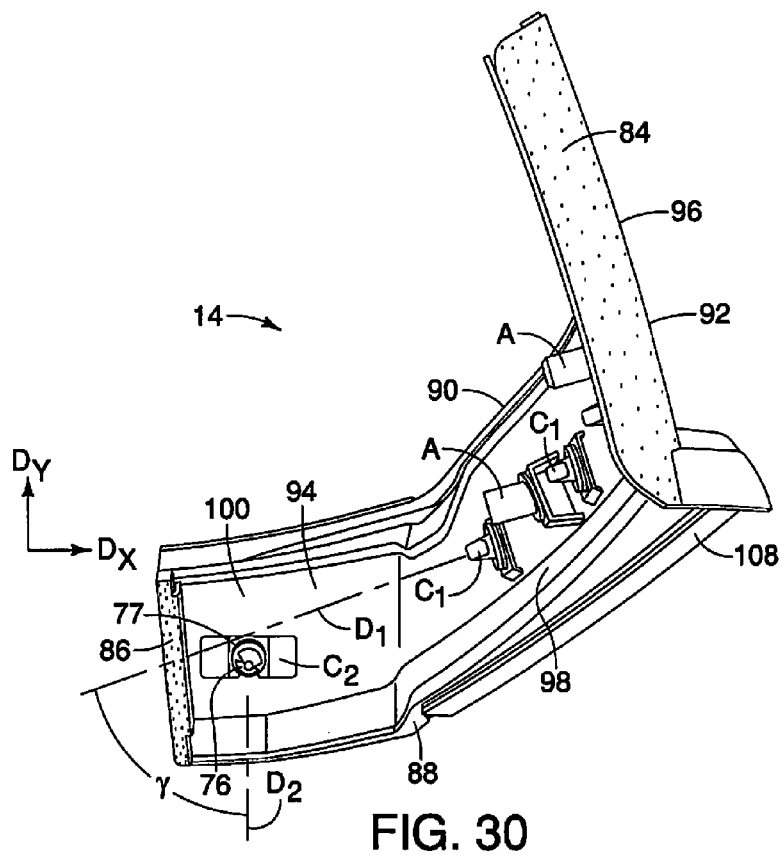
FIG. 30 is a front view of the exterior trim panel showing the front end and a portion of the body facing surface thereof in accordance with the first embodiment.

In FIG. 30, two of the first clips $C_1$ attached to the inboard surface 94 at the middle section 98 of the exterior trim panel 14 are visible and also extend parallel to one another. Further, the snap-fitting projections of those two first clips $C_1$ are parallel to one another, with the snap fitting projection 76d of the first clip $C_1$ extending in a first direction $D_1$, as shown in FIG. 30. In FIG. 30, the first direction $D_1$ of the first clip $C_1$ corresponds the direction $D_Z$ of the first clip $C_1$. The rear section 100 is angularly offset about vertical axis and angularly inclined with respect to vertical, and relative to the middle section 98 of the exterior trim panel 14, as is described above. The snap-fitting projection of the second clip $C_2$ installed to the rear section 100 of the exterior trim panel 14 is also angularly offset and angularly inclined with respect to the first clips $C_1$ on the middle section 98. Specifically, the snap-fitting projection of the second clip $C_2$ installed to the rear section 100 extends in a second direction $D_2$ that is angularly offset from the first direction $D_1$. In FIG. 30, the second direction $D_2$ of the second clip $C_2$ corresponds the direction $D_Z$ of the second clip $C_2$. As shown in FIG. 30, the first direction $D_1$ and the second direction $D_2$ are offset from one another by an angle $\gamma$ that is between 65 and 85 degrees. In the depicted embodiment, the angle $\gamma$ is 71 degrees.

Figure 31:
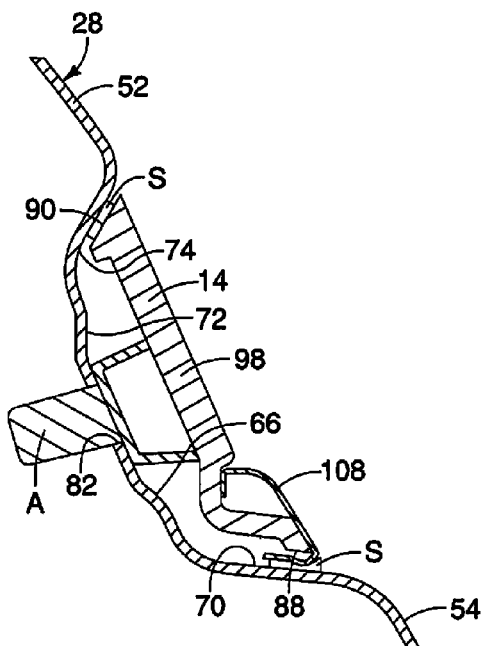
FIG. 31 is a cross-sectional view taken along the line 31-31 in FIG. 5 in accordance with the first embodiment.
Figure 32:
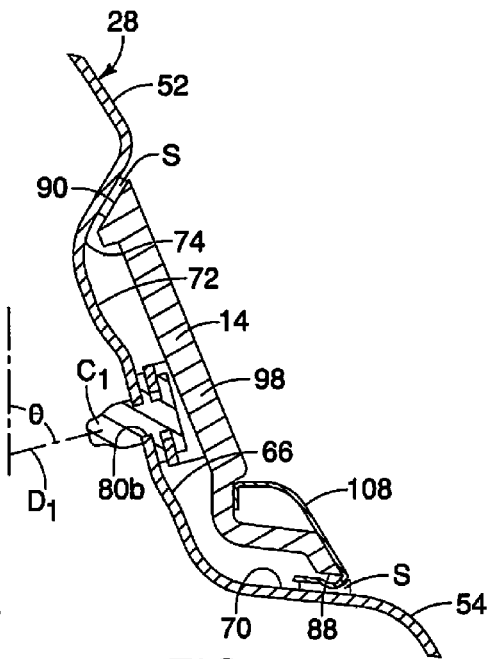
FIG. 32 is a cross-sectional view taken along the line 32-32 in FIG. 5 in accordance with the first embodiment.

As shown in the cross-section in FIG. 31, one of the alignment pins A extends through alignment apertures A, and in FIG. 32, the snap-fitting projection of one of the first clips $C_1$ extends through the aperture 80b. As also shown in FIG. 32, the direction $D_1$ is inclined with respect to vertical by an angle $\theta$ of between 60 and 80 degrees. The direction $D_2$ is inclined with respect to vertical by an angle that is equal to the angle $\alpha$ plus 90 degrees (the angle $\alpha$ is discussed above and shown in FIG. 1).

As is shown in FIGS. 31 and 32, when the exterior trim panel 14 is installed to the recess 66, sealing members S are used to reduce noise and water infiltration. More specifically, the sealing member S is located between the lower surface 70 of the recess 66 and the lower edge 88 of the exterior trim panel 14. Further, another one of the sealing member S is located between the upper surface 74 of the recess 66 and the upper edge 90 of the exterior trim panel 14. Hence, the exterior trim panel 14 is provided with the sealing members S (seals) that are positioned to contact the outboard surface 28a (an outboard facing surface) and the rearward facing surface 28b of the rear body panel 28, but are located within the recess 66.

The chrome trim member 108 attaches to the lower edge 88 of the exterior trim panel 14 providing a cosmetic accent to the overall appearance of the exterior trim panel 14. As shown in FIG. 12, the chrome trim member 108 has a closed end that aligns with the surface of the doorjamb 60. Similarly, the front end 84 of the exterior trim panel 14 is closed aligning with the surface of the doorjamb 60.

As shown in FIGS. 13-16, the chrome trim member 108 extends rearward from the front end 84 of the exterior trim panel 14 along the front section 96 and the middle section 98. However, in the depicted embodiment, the chrome trim member 108 ends just forward of the rear section 100 of the exterior trim panel 14. However, it should be understood from the drawings and the description herein that the chrome trim member 108 can be provided with a greater length in the vehicle longitudinal direction or can be completely eliminated. The inclusion and possible elimination of the chrome trim member 108 is a matter of cosmetic preference.

As shown in FIG. 12, the outboard facing surface 92 of the exterior trim panel 14 is flush with an adjacent section of the outboard facing surface 28a of the pillar portion 52 (above the recess 66). Further, as is also shown in FIG. 12 which shows an inboard direction I and an outboard direction $\theta$, the fender portion 54 (a lower section of the rear body panel 28) extends further outboard relative to the outboard surface 92 of the exterior trim panel 14.

In FIG. 5, relative dimensions of the exterior trim panel are identified. Specifically, an overall length $L_1$ of the exterior trim panel 14 as measured along the vehicle body waistline W is shown. A first height $L_2$ of the exterior trim panel 14 is measured adjacent to the rear end 86 of the exterior trim panel 14. Further, a maximum height $L_3$ is measured in a vertical direction at the front end 84 of the exterior trim panel 14. As is clearly shown in FIG. 5, the overall length is several times greater than either of the first height $L_2$ or the maximum height $L_3$. Further, the overall length $L_1$ of the exterior trim panel 14 more than five times the maximum height $L_3$, and more than nine times the first height $L_2$ in the depicted embodiment. However, it should be understood from the drawings and description herein that the ratios between the overall length $L_1$, the first height $L_2$, the maximum height $L_3$ of the exterior trim panel 14 can be adjusted and altered. However, in the depicted embodiments, the overall length $L_1$ of the exterior trim panel 14 is greater than the first height $L_2$ and greater than the maximum height $L_3$.

As shown in FIGS. 6 and 33, the rear end section 100 of the exterior trim panel 14 includes the rear end 86. The rear end 86 closes the inboard end of the exterior trim panel 14 while installed to the pillar portion 52 of the rear body panel 28. Further, an exposed outboard facing surface 112 of the rear window glass 44 faces the rear end 86 (the closed inboard end of the exterior trim panel 14).

The rear window glass 44 is installed to the rear window opening 34 in the absence of surrounding trim. In other words, at least the lateral edges, including the outboard facing surface 112, are exposed and or visible. Further, as mentioned above, the rear window glass 44 is provide with the non-transparent section 44b, which is darkened or black. Further the exterior trim panels 14 are darkened or black in appearance. In design configurations, such as those shown in FIGS. 6 and 23, there is a gap between the outboard facing surface 112 of the rear window glass 44 and the rear end 86 of the exterior trim panel 14. Therefore, as shown in FIGS. 6 and 33, a dark or black material 110 is provided on specific portions of a surface of rearward peripheral end 62 and the rear window supporting flange 64 of the pillar portion 52 of the rear body panel 28. The material 110 is dimensioned to align with the non-transparent section 44b of the rear window glass 44 and the rear section 100 of the exterior trim panel 14. In other words, the material 110 blackens space between the rear section 100 of the exterior trim panel 14 and the non-transparent section 44b (the black section) of the rear window glass 44. The material 110 can be a black tape or a black paint.

The black or dark lower portion of the non-transparent section 44b of the rear window glass 44, the black or dark material 110, the black or dark exterior trim panel 14, the black or dark non-transparent section 42c of the rear door 42, the black or dark trim panels covering the B-pillar 24 and the black or dark exterior surface of the A-pillars 22, along with the windshield of the vehicle 10 provide the roof structure 12 with a floating appearance. Under most lighting conditions, the lower portion of the non-transparent section 44b, the material 110, the exterior trim panels 14, the A-pillar 22, the B-pillar 24 and the non-transparent section 42c in the depicted embodiment are black, and appear to disappear making the roof structure 12 look as if it were separated from the remainder of the vehicle 10.

It should be understood from the drawings and the description herein that the vehicle 10, including the roof structure 12, the front door 40, the rear door 42, the trunk lid 46 and the fender portion 54 of the vehicle 10 are provided with a first exterior color while the lower portion of the non-transparent section 44b, the material 110, the exterior trim panel 14 and the non-transparent section 42c are all provided with generally the same dark second exterior color (for example, black), with the second exterior color being darker than the first exterior color. Consequently, the lower portion of the non-transparent section 44b, the material 110, the exterior trim panel 14 and the non-transparent section 42c define a uniform and dark colored stripe along an upper edge of the waistline W. This dark colored stripe provides the vehicle 10 with a floating roof appearance.

In the depicted first embodiment, the front section 96, the middle section 98 and the rear section 100 of the exterior trim panel 14 are formed as a continuous and single monolithic element, with no breaks or seams. In the first embodiment, the chrome trim member 108 is a separate element, but is provided as an accent and does not affect the floating roof appearance that is in part provided by the dark or black color of the outboard surface 92 of the exterior trim panel 14.

It should be understood from the drawings and the description herein that the vehicle 10 can include any of a variety of chrome trim elements that align with the chrome trim member 108. More specifically, the front door 40 and the rear door 42 can include chrome trim elements at the bottom of the forward side window 40a and the rearward side window 42a that combined with the chrome trim member 108, define a continuous chrome trim line that extends along the side of the vehicle 10, aligned with the vehicle body waistline W.

Second Embodiment

Figure 34:
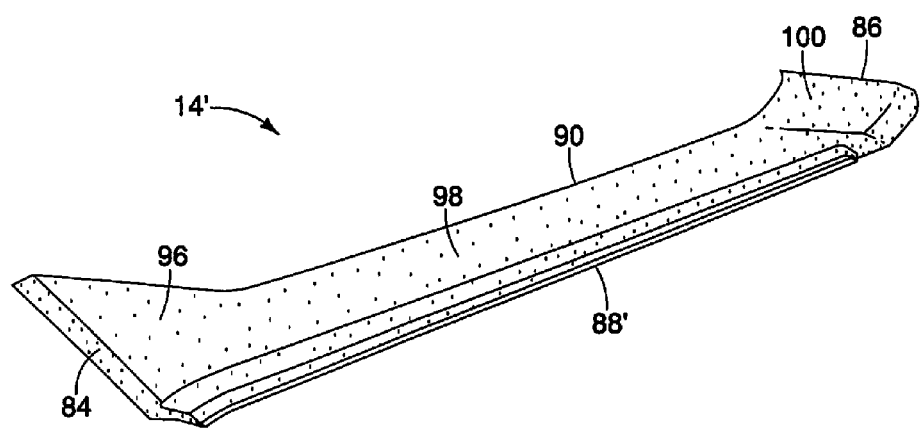
FIG. 34 is a perspective view similar to FIG. 13 of an exterior trim panel that is a one-piece, unitary monolithic element, showing an exterior surface and a front end thereof in accordance with a second embodiment.
Figure 35:
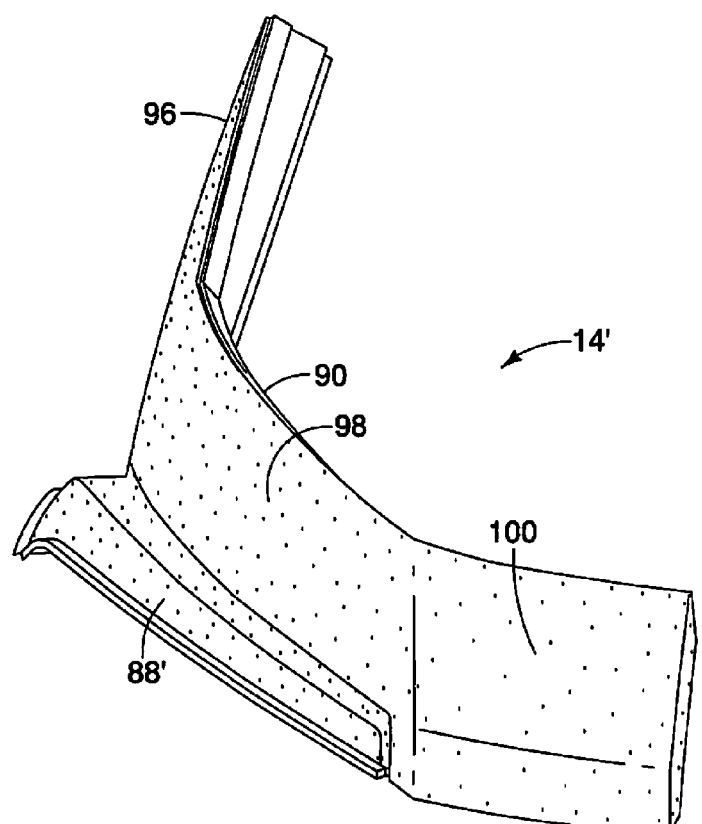
FIG. 35 is a rear view of the exterior trim panel shown in FIG. 34 in accordance with the second embodiment.
Figure 36:
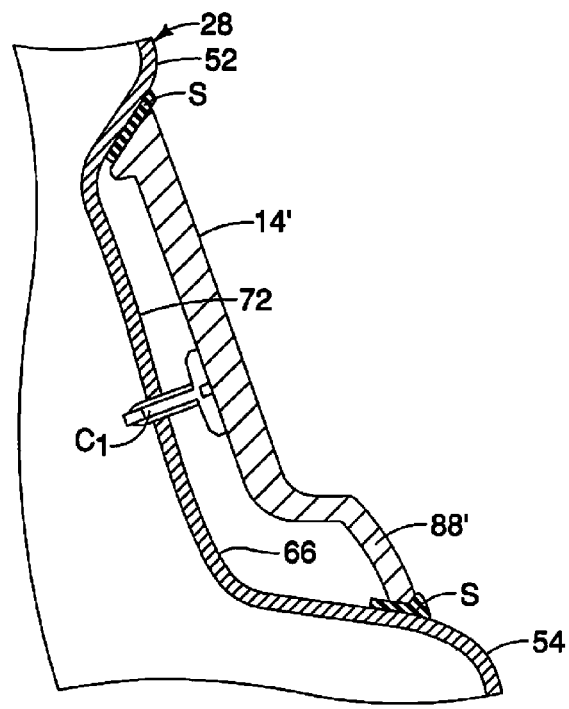
FIG. 36 is a cross-sectional similar to FIG. 32 showing the exterior trim panel installed to the pillar structure of the vehicle in accordance with the second embodiment.

Referring now to FIGS. 34, 35 and 36, an exterior trim panel 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the exterior trim panel 14' includes the upper edge 90, the front section 96, the middle section 98 and the rear section 100 as described above with respect to the first embodiment. However, in the second embodiment, the lower edge 88 of the first embodiment is modified such that a lower edge 88' is included that omits the chrome trim member 108. In other words, there is no chrome trim member 108 in the second embodiment. Rather, the lower edge 88' has the overall shape of the chrome trim member 108 of the first embodiment, but without any chrome being present. However, in a modification to the second embodiment, the lower edge 88' can be separately painted to provide a chrome finish, while maintaining the exterior trim panel 14' as a single, unitary monolithic element, rather than the two separate elements described above with respect to the exterior trim panel 14 and the chrome trim member 108 of the first embodiment.

Third Embodiment

Figure 37:
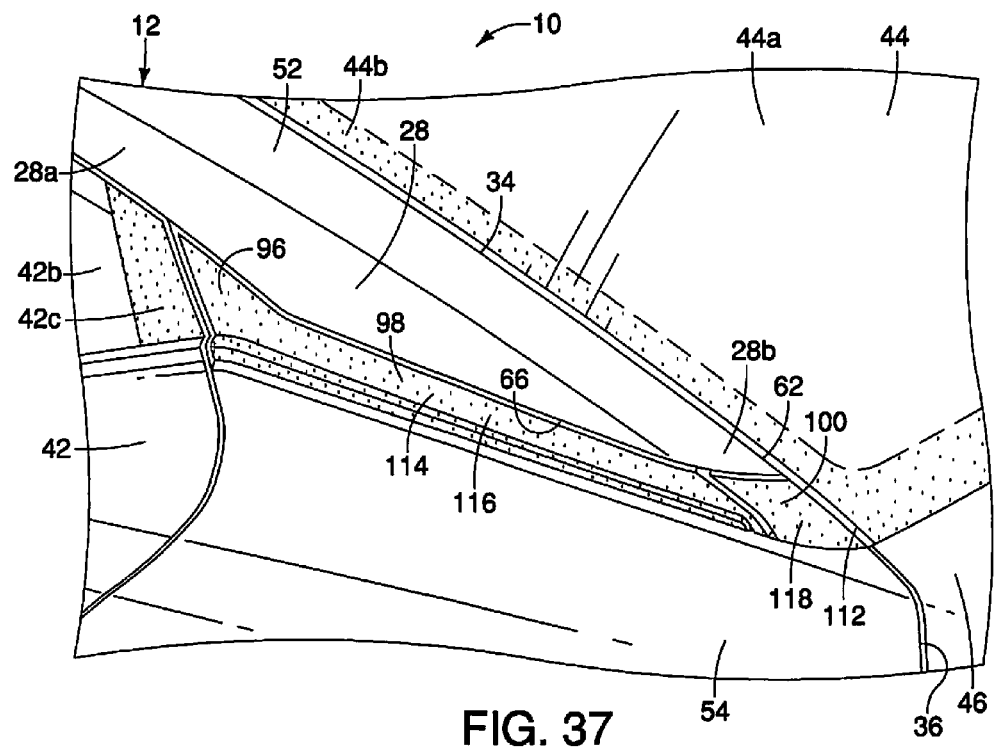
FIG. 37 is a perspective view similar to FIG. 5 showing an exterior trim panel that has a two-piece construction installed to the pillar structure of the vehicle in accordance with a third embodiment.
Figure 38:
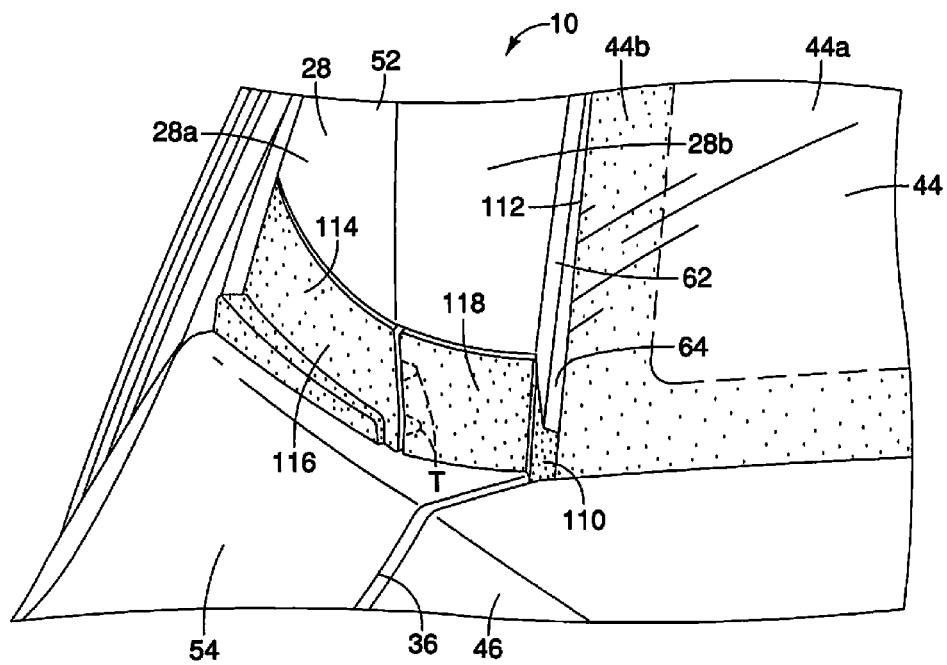
FIG. 38 is a rear view of the exterior trim panel shown in FIG. 37 in accordance with the third embodiment.

Referring now to FIGS. 37 and 38, the vehicle 10 is depicted with an exterior trim panel assembly 114 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the vehicle 10 includes the rear body panel 28, as described above with respect to the first embodiment. However, in the third embodiment the exterior trim panel 14 of the first embodiment is replaced with the exterior trim panel assembly 114.

As shown in FIGS. 37 and 38, the exterior trim panel assembly 114 includes a first section 116 and a second section 118. The first section 116 and the second section 118 are separate elements that are attached to one another during a manufacturing process. The first section 116 includes all of the features of the front section 96 and the middle section 98 of the first embodiment. In the third embodiment, the second section 118 has all of the features of the rear section 100 as described above with respect to the first embodiment.

In the third embodiment, the first section 116 can include a pair of tongue elements T that extend into slots (not shown) of the second section 118, attaching the first section 116 to the second section 118. The arrangements and locations of the first clips $C_1$, the second clip $C_2$ and alignment pins A of the first embodiment remain the same in the third embodiment with respect to the front section 96, the middle section 98 and the rear section 100, as described above with respect to the first embodiment. Therefore, further description is omitted for the sake of brevity.

Fourth Embodiment

Figure 39:
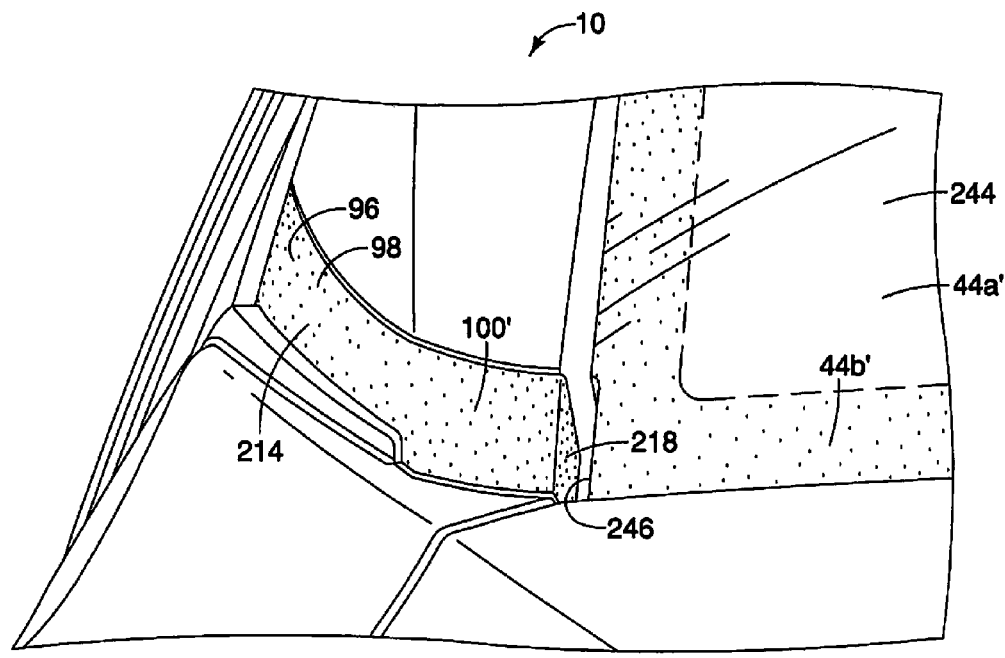
FIG. 39 is a rear view of a rear portion of the vehicle showing an exterior trim panel extending to the rear window in accordance with a fourth embodiment.
Figure 40:
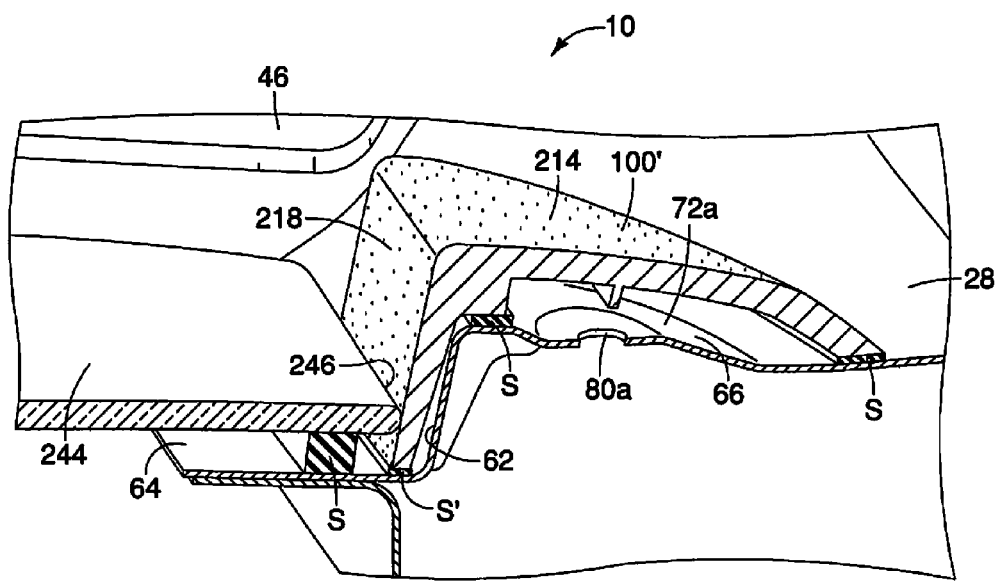
FIG. 40 is a cross-sectional view similar to FIG. 33, showing the exterior trim panel depicted in FIG. 39 including a rear end portion with an extension or flange that extends beyond an inner edge of a rear window of the vehicle in accordance with a fourth embodiment.

Referring now to FIGS. 39 and 40, the vehicle 10 having an exterior trim panel 214 and a rear window 244 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The rear body panel 28 of the vehicle 10 in the fourth embodiment is unchanged compared to the first embodiment. In the fourth embodiment, the exterior trim panel 14 is replaced with an exterior trim panel 214 and the rear window glass 44 is replaced with a rear window glass 244 that includes a transparent section 44a' and a non-transparent section 44b'. The rear window glass 244 is identical to the rear window glass 44 except that a notch 246 is formed at lower outboard edges thereof, as shown in FIG. 29. The notch 246 is provided to accommodate a feature of the exterior trim panel 214. The notch 246 has a width measured along a lateral edge of the rear window glass 244 that is approximately the same width as a non-transparent section 44b' of the rear window glass 244. The notch 246 can be an optional feature.

The exterior trim panel 214 includes the front section 96 and the middle section 98 as described above with respect to the exterior trim panel 14 of the first embodiment. The exterior trim panel 214 also includes a rear section 100' that includes all of the features of the rear section 100 of the first embodiment, except that the rear end 86 of the first embodiment has been extended to form a flange 218. The flange 218 extends downward into a space defined between the rearward peripheral end 62 of the pillar portion 52 of the rear body panel 28 and the notch 246 of the rear window glass 244, and above the rear window supporting flange 64. Further, the flange 218 is provided with a seal S' that is compressed between a bottom edge of the flange 218 and the rear window supporting flange 64.

As shown in FIG. 30, there is no need for the black material 110 described above with respect to the first embodiment. In other words, in the fourth embodiment, the black material 110 can be omitted.

Fifth Embodiment

Figure 41:
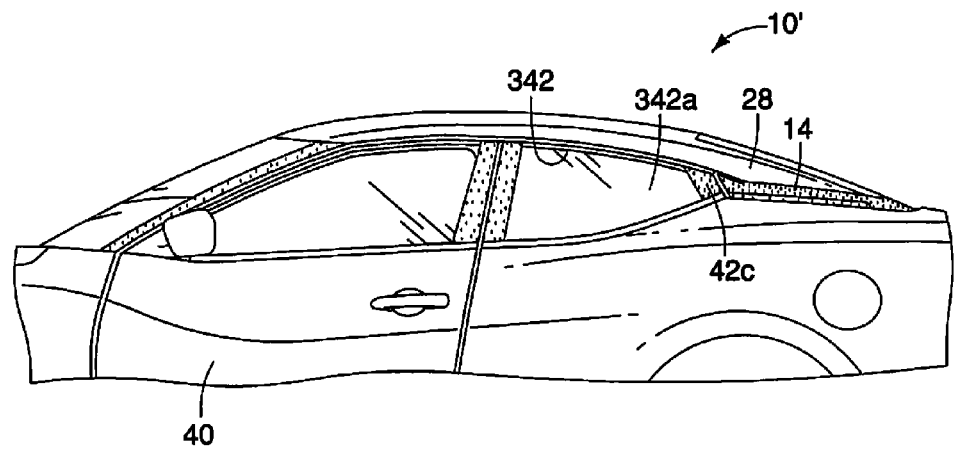
FIG. 41 is a side view of a vehicle that includes a rear side window with the exterior trim panel extending from the rear side window to the rear window in accordance with a fifth embodiment.

Referring now to FIG. 41, a vehicle 10' having the exterior trim panel 14 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the vehicle 10' is a two door coupe, with only one door per side. More specifically, the vehicle 10' includes the rear body panel 28 and the exterior trim panel 14, but does not include the rear door 42. Instead, the rear door opening 32 (a side opening) of the first embodiment is replaced with a rear fender portion extension and a side window opening 342. A rearward side window 342a is installed to the side window opening 342. The rearward side window 342a includes the non-transparent section 42c described above with respect to the first embodiment.

As in the first embodiment, the non-transparent section 42c and the exterior trim element 14 provide the roof structure 12 with a floating roof appearance.

The body features of the vehicle 10 and vehicle body structure 20 include may conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

Sixth Embodiment

Referring now to FIGS. 42-55, an exterior trim panel 14' in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The exterior trim panel 14' is identical to the exterior trim panel 14 of the first embodiment, except that the first clip $C_1$ is completely removed and replaced with a first clip $C_1'$, and the second clip $C_2$ is completely removed and replaced with a second clip $C_2'$. More specifically, the exterior trim panel 14' includes all of the features of the exterior trim panel 14 described above in the first embodiment, except the first and second clips $C_1$ and $C_2$.

Figure 42:
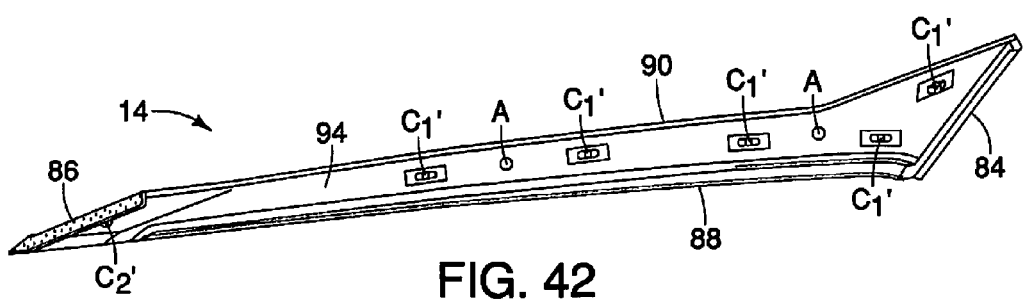
FIG. 42 is a side view of an exterior trim panel removed from the vehicle body structure showing a body facing surface thereof including the alignment pins, a plurality of first clips each having a snap fitting projection and one second clip that includes a snap fitting projection in accordance with the sixth embodiment.
Figure 43:
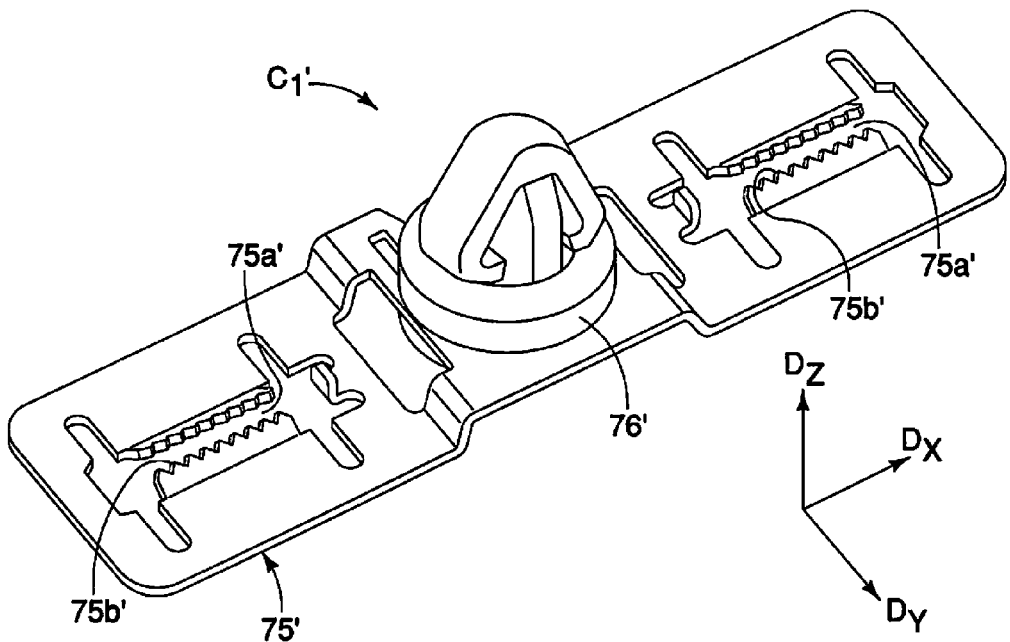
FIG. 43 is a perspective view of one of the plurality of first clips shown removed from the exterior trim panel in accordance with the sixth embodiment.
Figure 44:
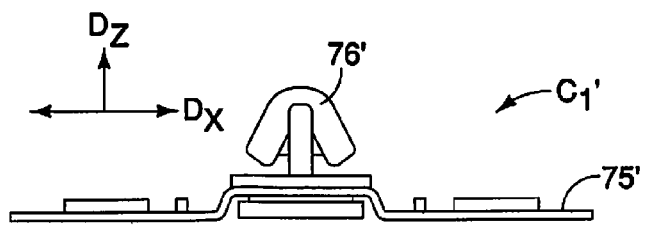
FIG. 44 is a side view of the first clip depicted in FIG. 43 showing the snap fitting projection in accordance with the sixth embodiment.
Figure 45:
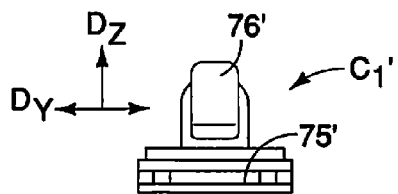
FIG. 45 is an end view of the first clip showing the snap fitting projection in accordance with the sixth embodiment.

As shown in FIG. 42, the inboard surface 94 of the exterior trim panel 14' is provided with the plurality of the first clips $C_1'$ at locations corresponding the locations of the first clips $C_1$ of the first embodiment and the second clip $C_2'$ is provided at a location corresponding the location of the second clip $C_2$ of the first embodiment. Specifically, the first clips $C_1'$ are installed to the inboard surface 94 along the front section 96 and the middle section 98 of the exterior trim panel 14. The second clip $C_2'$ is installed to the inboard surface 94 at the rear section 100.

A description of the first clips $C_1'$ and the second clip $C_2'$ is provided now with specific reference to FIGS. 43-55. The second clip $C_2'$ has a different structure and provide differing benefits and attachment configurations as compared to the first clips $C_1'$, as is explained below.

One of the first clips $C_1'$ is shown removed from the inboard surface 94 in FIGS. 43-48. Since all of the first clips $C_1'$ are functionally identical and structurally the same, description of one of the first clips $C_1'$ applies equally to all of the plurality of first clips $C_1'$.

The first clip $C_1'$ includes a base plate 75' and a fastening member 76'. The base plate 75' (also referred to as an elongated attachment plate) includes openings 75a' and grip portions 75b' at opposite sides of each of the openings 75a'. The grip portions 75b' are employed to press-fit the base plate 75' to conventional attachment projections $P_1$ formed on the exterior trim panel 14 (see FIGS. 47, 49 and 50). The base plate 75' also includes a central slot 75c' configured to receive and retain the fastening member 76'. As shown in FIG. 48, the central slot 75c' has a width $W_1'$ and retaining arms 75d'. The retaining arms 75d' serve to retain the fastening member 76' within the central slot 75c'.

Figure 46:
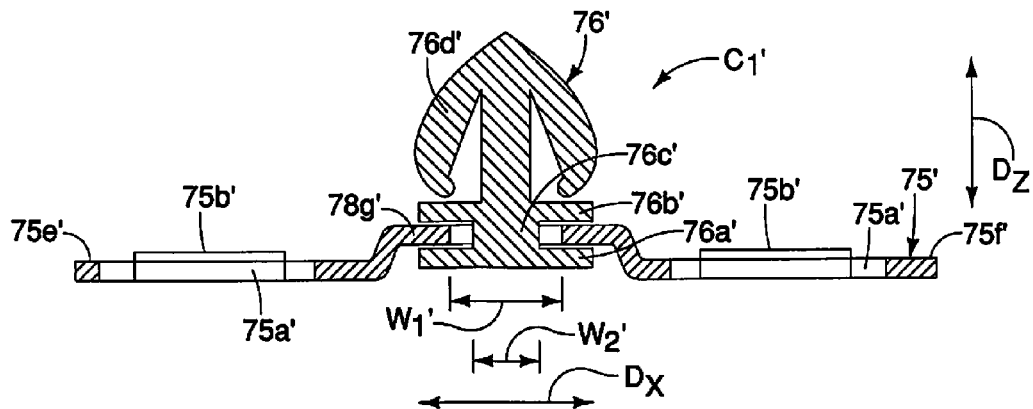
FIG. 46 is a cross-sectional view of the first clip showing an elongated attachment plate and a fastener portion that includes the snap fitting projection in accordance with the sixth embodiment.
Figure 47:
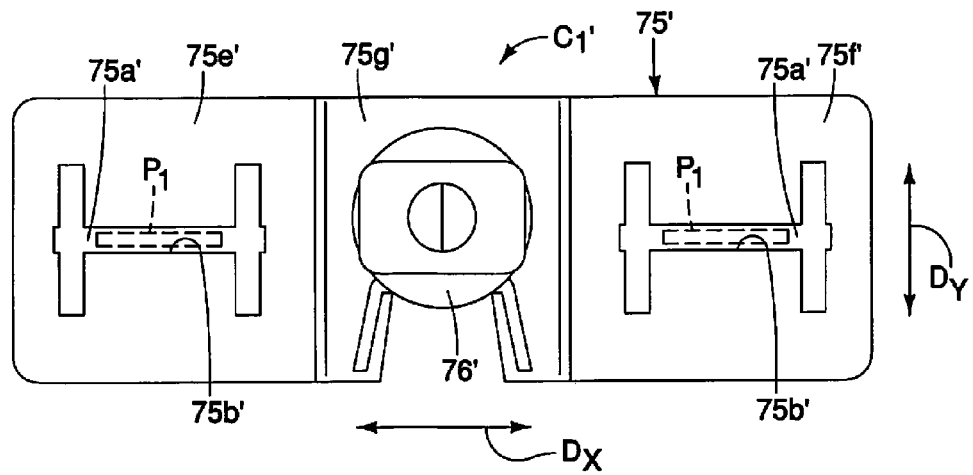
FIG. 47 is a top view of the first clip showing the elongated attachment plate and the fastener portion in accordance with the sixth embodiment.
Figure 48:
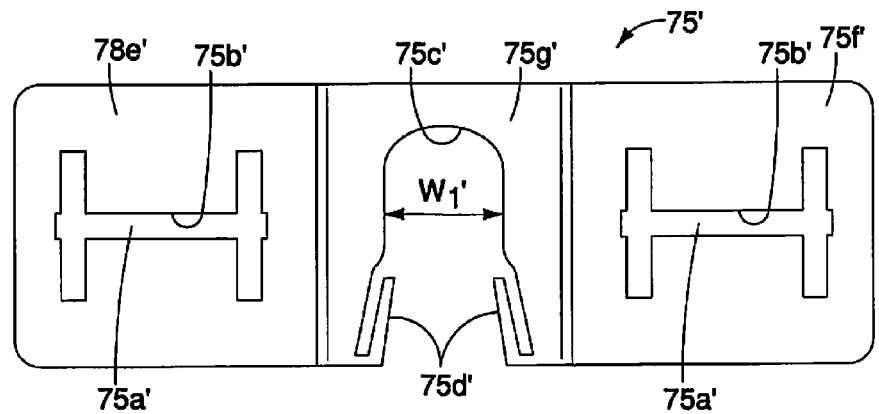
FIG. 48 is a top view of the elongated attachment plate with the fastener portion removed in accordance with the sixth embodiment.

The base plate 75' can be a flat member or, as shown in FIGS. 46-48, can be formed with three portions, a first end portion 75e', a second end portion 75f and a central portion 75g'. The first end portion 75e' and the second end portion 75f are co-planar. The central section 75g' is offset from the first end portion 75e' and the second end portion 75f but is parallel to the first end portion 75e' and the second end portion 75f. The openings 75a' are formed in each of the first end portion 75e' and the second end portion 75f, and the central slot 75c' is formed in the central portion 75g'. The central slot 75c' is open to a lateral side of the central portion 75g'.

As shown in FIG. 46, the fastening member 76' includes a first plate 76a', a second plate 76b', a shaft portion 76c' and a snap fitting projection 76d'. The first plate 76a' and second plate 76b' are spaced apart from one another by a distance that is approximately equal to the thickness of the base plate 75'. The first plate 76a' and second plate 76b' are fixedly attached to one another by the shaft portion 76c'. The shaft portion 76c' has an outer diameter $W_2'$ that is smaller than width $W_1'$ of the central slot 75c'. Consequently, with the fastener member 76' installed to the central slot 75c' of the base plate 75', the shaft portion 76c' can move in the directions $D_X$ and $D_Y$. Further, the fastening member 76' is moveable relative to the base plate 75 in the directions $D_X$ and $D_Y$ (FIGS. 43 and 47) but is prevented from moving in the direction $D_Z$ (FIGS. 43 and 46) due to the spacing between the first plate 76a' and the second plate 76b' and the thickness of the base plate 75'. Hence, those portions of the exterior trim panel 14' that are attached to the vehicle body structure 20 by the clips $C_1'$ are able to undergo limited movement the directions $D_X$ and $D_Y$ but are prevented from moving in the direction Dz.

The second clip $C_2$ is shown removed from the inboard surface 94 in FIGS. 49-54. The second clip $C_2'$ includes the base plate 75' and a fastening member 78'. The base plate 75' is identical to that described above with respect to the first clip $C_1'$. The base plate 75' includes the central slot 75c' as described above and is configured to receive and retain the fastening member 78' in a manner similar to the fastening member 76' of the first clip $C_1'$, but with the differences described below.

Figure 50:
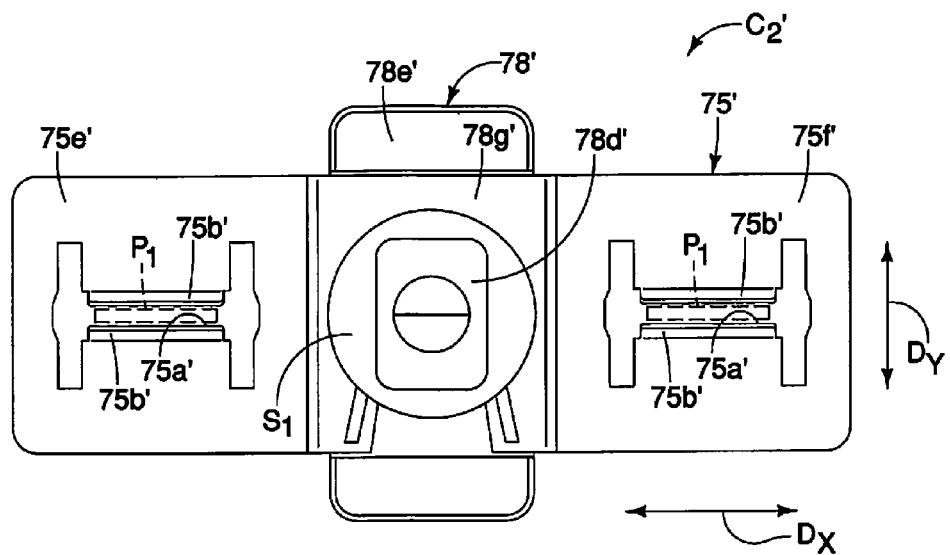
FIG. 50 is a top view of the second clip depicted in FIG. 49 showing an elongated attachment plate and a fastener portion that includes the snap fitting projection in accordance with the sixth embodiment.
Figure 51:
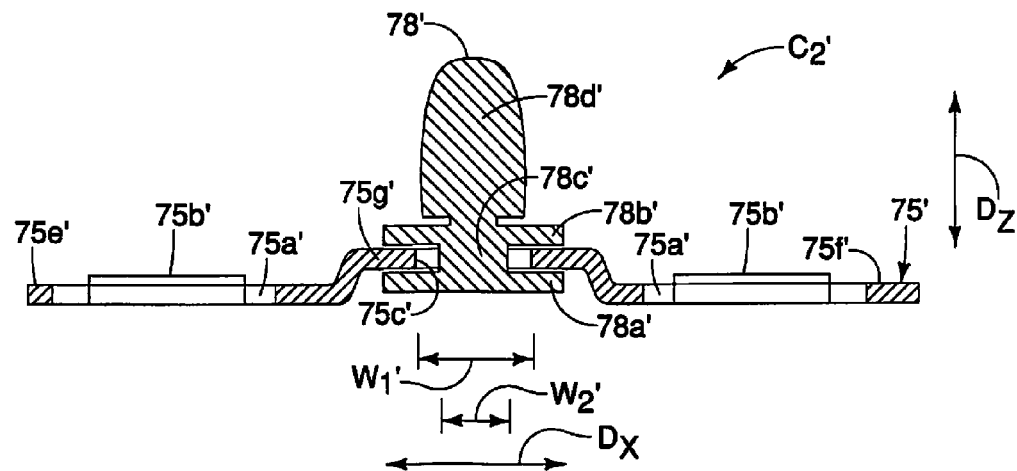
FIG. 51 is a cross-sectional view of the second clip showing details of the elongated attachment plate and the fastener portion in accordance with the sixth embodiment.
Figure 52:
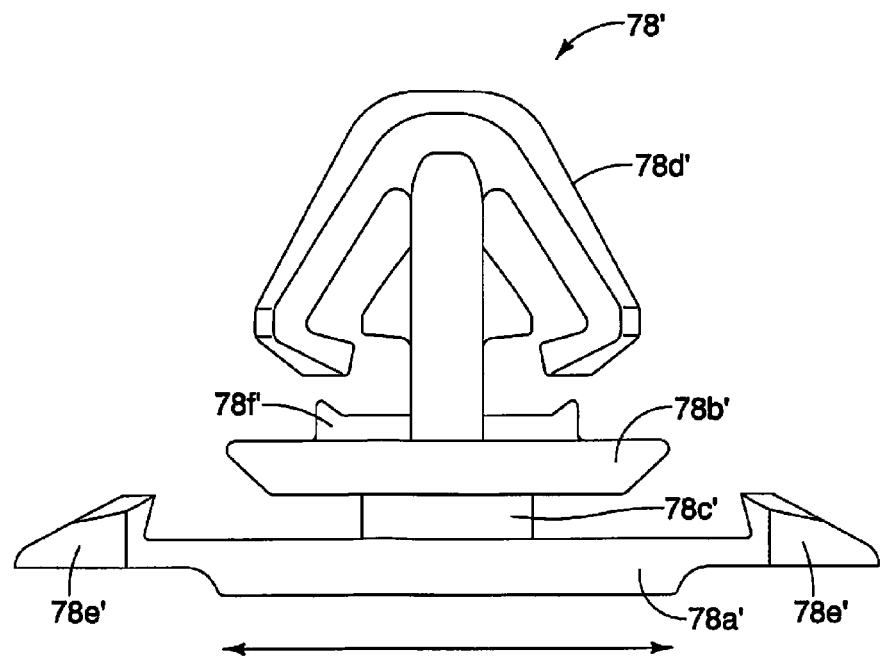
FIG. 52 is a side view of the fastener portion of the second clip shown removed from the elongated attachment plate in accordance with the sixth embodiment.
Figure 53:
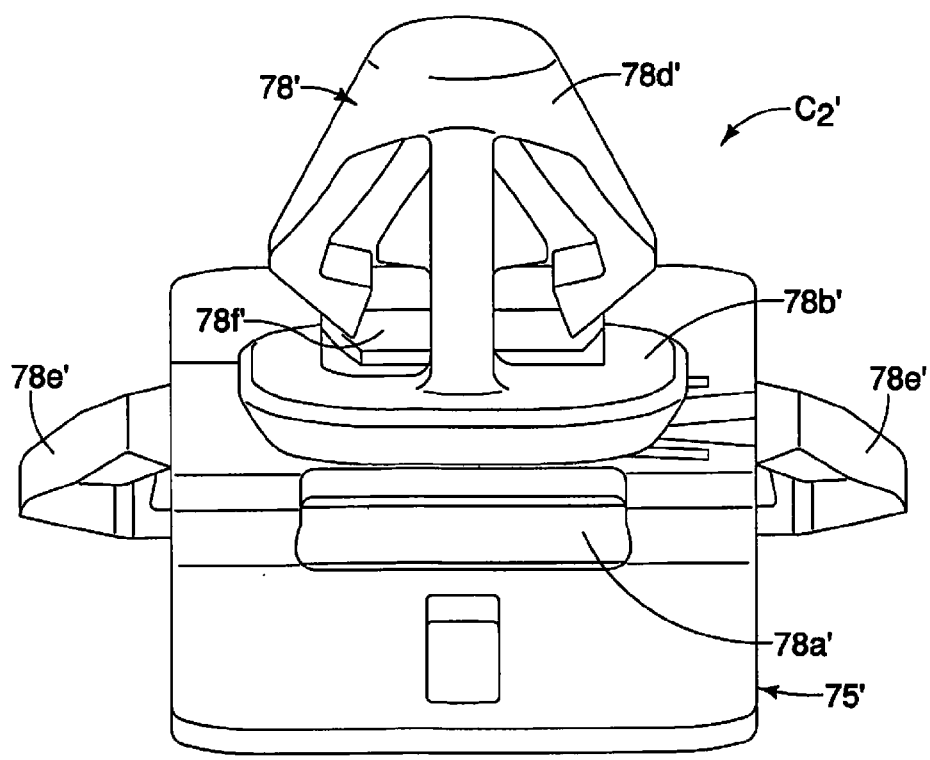
FIG. 53 is a perspective view of the second clip showing lateral end projections that restrict movement of the fastener portion relative to the elongated attachment plate in accordance with the sixth embodiment.
Figure 54:
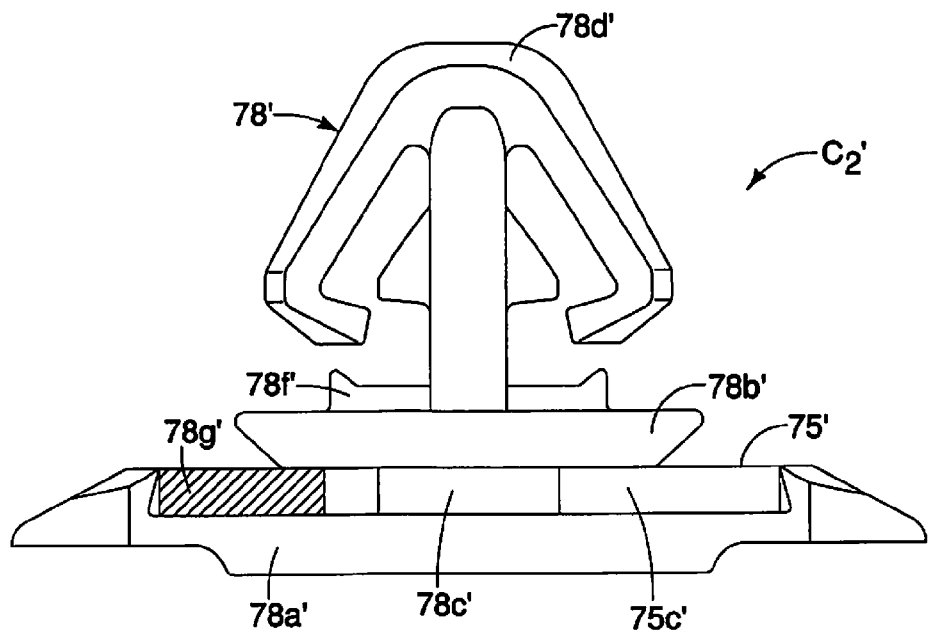
FIG. 54 is a cross-sectional view of the second clip further showing the lateral end projections that restrict movement of the fastener portion relative to the elongated attachment plate in accordance with the sixth embodiment.

As shown in FIG. 51, the fastening member 78' includes a first plate 78a', a second plate 78b', a shaft portion 78c', a snap fitting projection 78d' and lateral projections 78e'. The first plate 78a' and second plate 78b' are spaced apart from one another by a distance that is approximately equal to the thickness of the base plate 75'. The first plate 78a' and second plate 78b' are fixedly attached to one another by the shaft portion 78c'. The shaft portion 78c' has an outer diameter $W_2$ that is smaller than width $W_1'$ in a manner similar to the first clip $C_1'$. The lateral projections 78e' are spaced apart from one another by a distance that is substantially equal to the width of the base plate 75'. Consequently, with the fastener member 78' installed to the central slot 75c' of the base plate 75', the shaft portion 78c' can move in the direction $D_X$. Therefore, the fastening member 78' can undergo limited movement relative to the base plate 75' in the direction $D_X$ (FIGS. 49-51) but is prevented from moving in the direction $D_Y$ due to contact between the lateral projections 78e' and side edges of the base plate 75'.

More specifically, the lateral projections 78e' are located at opposite sides of the fastening member 78' and are spaced apart from one another such that the lateral projections 78e' contact and trap the base plate 75' therebetween. Hence, the fastening member 78' of the second clip $C_2'$ is prevented from moving in direction $D_Y$. Further, the fastening member 78' is prevented from moving in the direction $D_Z$ (FIGS. 49 and 51) due to the spacing between the first plate 78a' and the second plate 78b' and the thickness of the base plate 75'. Hence, that portion of the exterior trim panel 14' that is attached to the vehicle body structure 20 by the second clip $C_2'$ is able to undergo only limited movement the direction $D_X$ but is prevented from moving in the directions $D_Y$ and $D_Z$ relative to the second clip $C_2'$. Further, with the second clip $C_2'$ attaching the rear section 100 of the exterior trim panel 14' to the rear body panel 28, the rear section 100 is prevented from deflecting relative to the front section 96 and the middle section 98 of the exterior trim panel 14'.

Figure 49:
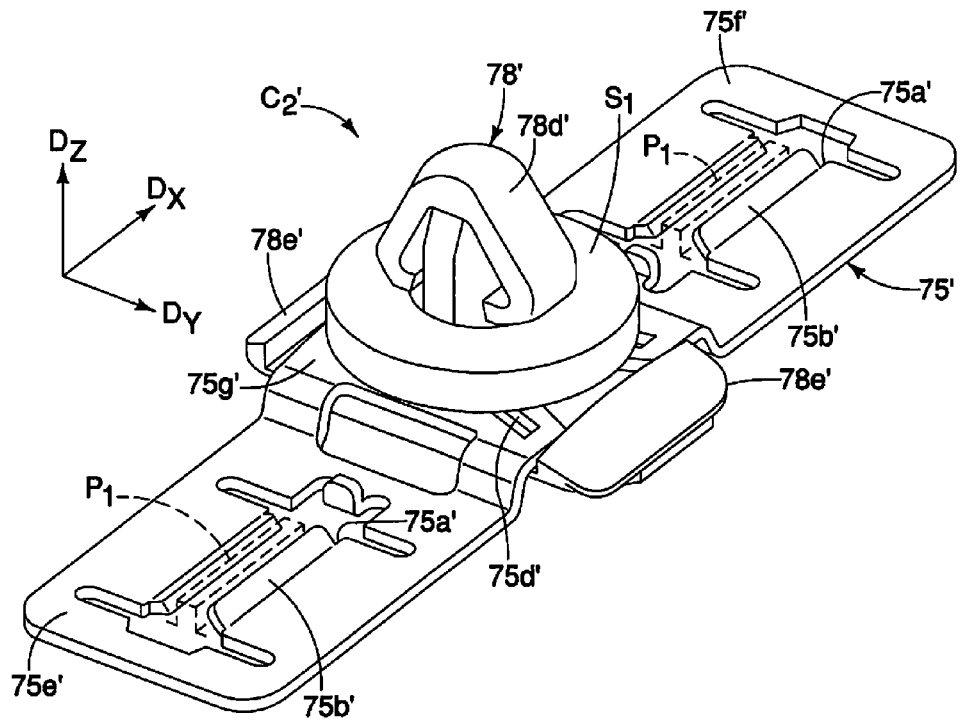
FIG. 49 is a perspective view of the second clip shown removed from the exterior trim panel in accordance with the sixth embodiment.

The fastener member 78' can also include a flange 78f (FIGS. 52 and 54) that is provided to center a seal $S_1$ (FIG. 49). The seal $S_1$ can be installed to prevent the egress of moisture into the interior of the vehicle 10.

The first clips $C_1'$ and the second clip $C_2'$ attach to the inboard surface 94 via the openings 75a' in the base plate 75'. The openings 75a' are basically elongated slots that extend in the direction $D_X$ of the base plate 75'. The openings 75a' are dimensioned to receive the projections $P_1$ (also referred to as pins) formed on the inboard surface 94 of the exterior trim panel 14', as shown in FIGS. 47, 49 and 50. The openings 75a' extend in a longitudinal direction of the base plate 75', where the longitudinal direction of the base plate 75' corresponds to the direction $D_X$ in FIGS. 43, 44, 46, 47, and 49-51. In the direction $D_X$, the openings 75a' (elongated slots) are longer than the projections $P_1$. Once the base plates 75' are pressed onto respective pairs of the projections $P_1$, the grip portions 75b' press against the projections $P_1$ fixing the first and second clips $C_1'$ and $C_2'$ in position to the exterior trim panel 14'.

As on the first embodiment, the alignment pins A are rigidly fixed to or integrally formed with the inboard surface 94 in order to ensure proper positioning of the exterior trim panel 14' relative to the rear body panel 28.

Figure 55:
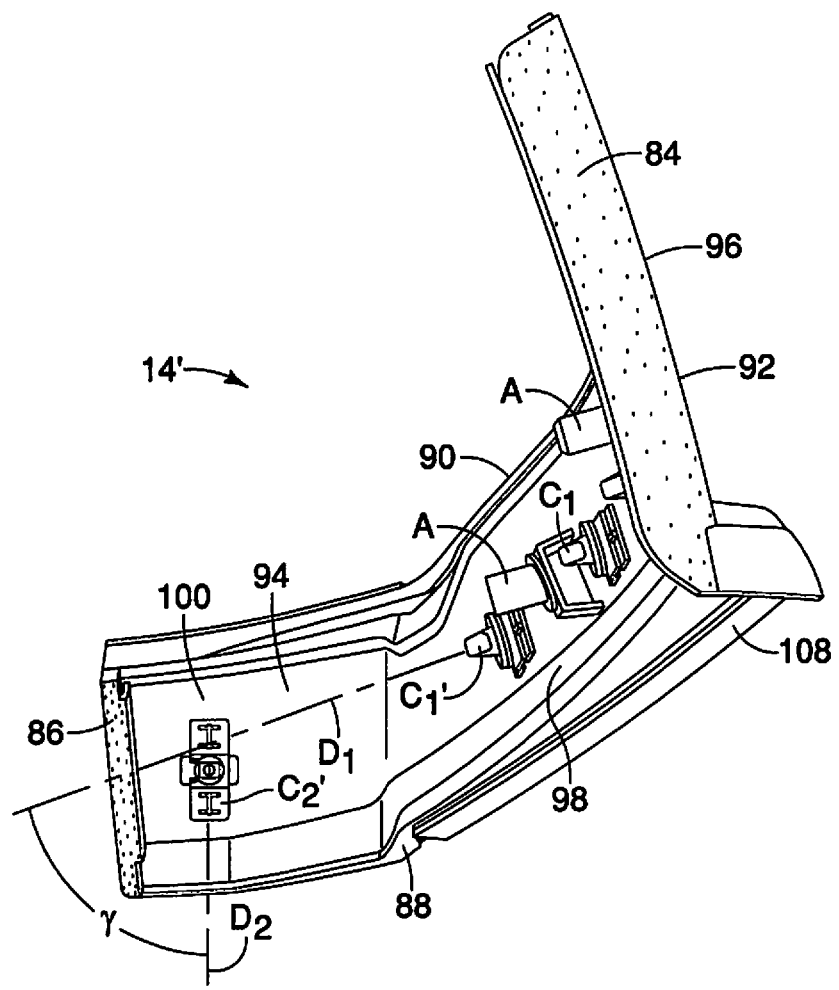
FIG. 55 is a front view of the exterior trim panel showing the front end and a portion of the body facing surface thereof in accordance with the sixth embodiment.

In FIG. 55, two of the first clips $C_1'$ are attached to the inboard surface 94 at the middle section 98 of the exterior trim panel 14' are visible and also extend parallel to one another. Further, the snap-fitting projections of those two first clips C are parallel to one another, with the snap fitting projection 76d' of the first clip $C_1'$ extending in the first direction $D_1$, as shown in FIG. 55. In FIG. 55, the first direction $D_1$ of the first clip $C_1'$ corresponds the direction $D_Z$ of the first clip $C_1'$. The rear section 100 is angularly offset about vertical axis and angularly inclined with respect to vertical, and relative to the middle section 98 of the exterior trim panel 14', as is described above. The snap-fitting projection 78d' of the second clip $C_2'$ installed to the rear section 100 of the exterior trim panel 14' is also angularly offset and angularly inclined with respect to the first clips $C_1'$ on the middle section 98. Specifically, the snap-fitting projection 78d' of the second clip $C_2'$ installed to the rear section 100 extends in the second direction $D_2$ that is angularly offset from the first direction $D_1$. In FIG. 55, the second direction $D_2$ of the second clip $C_2'$ corresponds the direction $D_Z$ of the second clip $C_2'$. As shown in FIG. 55, the first direction $D_1$ and the second direction $D_2$ are offset from one another by an angle γ that is between 65 and 85 degrees. In the depicted embodiment, the angle γ is 71 degrees.

The installation of the exterior trim panel 14' is otherwise identical to the installation of the exterior trim panel 14, as described above with respect to the first embodiment.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a rear body panel having an outboard facing surface and a rearward facing surface, the outboard facing surface having a front peripheral edge, the rearward facing surface having an inboard peripheral edge, the outboard facing surface being a substantially upright surface and defining at least one alignment aperture, the rearward facing surface being an inclined surface relative to a vertical direction and a horizontal direction;
   an exterior trim panel having a finished surface and an attachment surface, the exterior trim panel further having a first section extending rearward from the front peripheral edge along the outboard facing surface and a second section that extends in a lateral inboard direction from a rearward end of the first section along the rearward facing surface to the inboard peripheral edge, the attachment surface including at least one alignment pin that extends into the at least one alignment aperture;
   a plurality of first attachment clips attached to the attachment surface at spaced apart locations along the first section, each of the first attachment clips being attached to the rear body panel along the outboard facing surface in order to prevent movement of the first section of the exterior trim panel in directions normal to the outboard facing surface at corresponding ones of the spaced apart locations of the outboard facing surface; and
   a second attachment clip fixed to the attachment surface at a location along the second section such that the second attachment clip is attached to the rear body panel along the rearward facing surface adjacent to the inboard peripheral edge, the second attachment clip being configured to prevent deflection of the second section relative to the first section.

2. The vehicle body structure according to claim 1, wherein the second attachment clip includes base portion and a fastener portion, the base portion having a slot formed in a central section thereof and the fastener portion having a slot engagement portion that is inserted into the slot of the base portion and a snap-fitting projection, and the base portion is fixed to the attachment surface of the exterior trim panel and the snap-fitting projection is inserted into an opening formed in the rearward facing surface.

3. The vehicle body structure according to claim 2, wherein the base portion defines a doghouse structure integrally formed with the exterior trim panel along the attachment surface of the exterior trim panel.

4. The vehicle body structure according to claim 3, wherein the doghouse structure of the base portion includes a web that is parallel and spaced apart from attachment surface of the exterior trim panel.

5. The vehicle body structure according to claim 4, wherein the slot of the base portion extends in a direction that is approximately vertical and is dimensioned to prevent movement of the snap-fitting projection in a direction perpendicular to a lengthwise direction of the slot.

6. The vehicle body structure according to claim 5, wherein the slot engagement portion of the fastener portion defines a diameter and the slot defines a mid-section that is dimensioned to prevent movement of the fastener portion within the slot in the lateral inboard direction.

7. The vehicle body structure according to claim 6, wherein the rear body panel further has a curved surface extending between the outboard facing surface and the rearward facing surface, the curved surface having a complex geometry curving from the outboard facing surface to the rearward facing surface, and
the second section of the exterior trim panel has a curved portion that extends over the curved surface of the rear body panel from a rearward end of the first section curving and inclining to the rearward facing surface.

8. The vehicle body structure according to claim 1, wherein the rear body panel further has a curved surface extending between the outboard facing surface and the rearward facing surface, the curved surface having a complex geometry curving from the outboard facing surface to the rearward facing surface, and
the second section of the exterior trim panel has a curved portion that extends over the curved surface of the rear body panel from a rearward end of the first section curving and inclining to the rearward facing surface.

9. The vehicle body structure according to claim 8, wherein the second attachment clip includes a base portion and a fastener portion, the base portion having a slot formed in a central section thereof and the fastener portion having a slot engagement portion that is inserted into the slot of the base portion and snap-fitting projection, and the base portion is fixed to the attachment surface of the exterior trim panel and the snap-fitting projection is inserted into an opening formed in the rearward facing surface.

10. The vehicle body structure according to claim 9, wherein
the base portion defines a doghouse structure integrally formed with the exterior trim panel along the attachment surface of the exterior trim panel.

11. The vehicle body structure according to claim 10, wherein
the doghouse structure of the base portion includes a web that is parallel and spaced apart from attachment surface of the exterior trim panel.

12. The vehicle body structure according to claim 11, wherein
the slot of the base portion extends in a direction that is approximately vertical and is dimensioned to prevent movement of the snap-fitting projection in a direction perpendicular to a lengthwise direction of the slot.

13. The vehicle body structure according to claim 12, wherein
the slot engagement portion of the fastener portion defines a diameter and the slot defines a mid-section that is dimensioned to prevent movement of the fastener portion within the slot in the lateral inboard direction.

14. The vehicle body structure according to claim 9, wherein
the second attachment clip is fixed to the attachment surface of the exterior trim panel such that a lengthwise direction of the base portion is orthogonal to the lengthwise direction of the second section and orthogonal to a direction normal to the rearward facing surface.

15. The vehicle body structure according to claim 1, wherein
the pillar portion of the rear body panel includes a recess formed along the outboard facing surface and the rearward facing surface adjacent to a vehicle body waistline, the recess extending along the outboard facing surface and the rearward facing surface from the side opening to the rear window opening, and
the exterior trim panel is at least partially disposed within the recess.

16. The vehicle body structure according to claim 15, wherein
the second attachment clip includes a base portion and a fastener portion, the base portion having a slot formed in a central section thereof and the fastener portion having a slot engagement portion that is inserted into the slot of the base portion and snap-fitting projection, and
the base portion is fixed to the attachment surface of the exterior trim panel and the snap-fitting projection is inserted into an opening formed in the rearward facing surface.

17. The vehicle body structure according to claim 16, wherein
the base portion defines a doghouse structure integrally formed with the exterior trim panel along the attachment surface of the exterior trim panel.

18. The vehicle body structure according to claim 17, wherein
the doghouse structure of the base portion includes a web that is parallel and spaced apart from attachment surface of the exterior trim panel.

19. The vehicle body structure according to claim 18, wherein
the slot of the base portion extends in a direction that is approximately vertical and is dimensioned to prevent movement of the snap-fitting projection in a direction perpendicular to a lengthwise direction of the slot.

20. The vehicle body structure according to claim 19, wherein
the slot engagement portion of the fastener portion defines a diameter and the slot defines a mid-section that is dimensioned to prevent movement of the fastener portion within the slot in the lateral inboard direction.

* * * * *